US011467348B2

(12) United States Patent
Verheyden

(10) Patent No.: US 11,467,348 B2
(45) Date of Patent: Oct. 11, 2022

(54) FIBER OPTIC CONNECTORS, FIBER OPTIC ADAPTERS AND RELATED FIBER OPTIC CONNECTION SYSTEMS

(71) Applicant: COMMSCOPE TECHNOLOGIES LLC, Hickory, NC (US)

(72) Inventor: Danny Willy August Verheyden, Gelrode (BE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/272,196

(22) PCT Filed: Aug. 22, 2019

(86) PCT No.: PCT/US2019/047704
§ 371 (c)(1),
(2) Date: Feb. 26, 2021

(87) PCT Pub. No.: WO2020/046709
PCT Pub. Date: Mar. 5, 2020

(65) Prior Publication Data
US 2021/0311262 A1 Oct. 7, 2021

Related U.S. Application Data

(60) Provisional application No. 62/724,356, filed on Aug. 29, 2018.

(51) Int. Cl.
*G02B 6/38* (2006.01)
(52) U.S. Cl.
CPC ......... *G02B 6/3809* (2013.01); *G02B 6/3849* (2013.01)
(58) Field of Classification Search
None
See application file for complete search history.

(56) References Cited

U.S. PATENT DOCUMENTS 5,734,770 A * 3/1998 Carpenter .............. G02B 6/389
385/72
5,923,805 A * 7/1999 Anderson ............ G02B 6/3825
385/86

(Continued)

FOREIGN PATENT DOCUMENTS

EP          1 039 322 A1    9/2000
WO       WO99/57593 A1    11/1999

(Continued)

OTHER PUBLICATIONS

International Search Report and Written Opinion of the International Searching Authority for International Patent Application No. PCT/US2019/047704 dated Dec. 12, 2019, 18 pages.

(Continued)

*Primary Examiner* — Michael Stahl
(74) *Attorney, Agent, or Firm* — Merchant & Gould P.C.

(57) ABSTRACT

The present disclosure relates to a fiber optic adapter having a footprint/form factor compatible with an SC adapter mounting structure or an LC adapter mounting structure or both the SC and LC adapter mounting structures. The adapter body may include first and second co-axially aligned connector ports for respectively receiving first and second fiber optic connectors. The fiber optic adapter may also include a fiber alignment structure configured to accommodate at least 12 optical fibers (e.g., 12 non-ferrulized optical fibers) for each of the first and second connector ports. Another aspect of the present disclosure relates to a fiber optic adapter with linearly moveable, spring biased shutters. A further aspect of the present disclosure relates to a ferrule-less fiber optic connector that may include a telescopic shroud and a safety lock for locking the shroud in a fiber protecting position. A further aspect of the present (Continued)

disclosure relates to a ferrule-less fiber optic connector with a spring-biased fiber holder.

22 Claims, 28 Drawing Sheets

(56) References Cited

U.S. PATENT DOCUMENTS

| | | | |
|---|---|---|---|
| 6,142,676 | A | 11/2000 | Lu |
| 7,182,524 | B2 | 2/2007 | Kramer et al. |
| 8,636,425 | B2* | 1/2014 | Nhep .................. G02B 6/3861 |
| | | | 385/81 |
| 8,870,466 | B2 | 10/2014 | Lu |
| 8,985,864 | B2 | 3/2015 | Ott |
| 9,575,272 | B2 | 2/2017 | Ott |
| 2002/0041738 | A1 | 4/2002 | Carberry et al. |
| 2011/0033158 | A1 | 2/2011 | Smith et al. |
| 2011/0198324 | A1* | 8/2011 | de Jong ................ G02B 6/245 |
| | | | 219/121.72 |
| 2011/0235976 | A1 | 9/2011 | Lu |
| 2016/0004018 | A1 | 1/2016 | Lu et al. |

FOREIGN PATENT DOCUMENTS

| | | |
|---|---|---|
| WO | 2012/112344 A1 | 8/2012 |
| WO | 2013/117598 A2 | 8/2013 |
| WO | 2016/043922 A1 | 3/2016 |
| WO | 2016/100384 A1 | 3/2016 |
| WO | 2017/081300 A1 | 5/2017 |
| WO | 2017/081306 A1 | 5/2017 |
| WO | 2017/192461 A2 | 11/2017 |
| WO | 2017/223072 A1 | 12/2017 |
| WO | 2018/020022 A1 | 2/2018 |
| WO | 2018/144128 A1 | 8/2018 |
| WO | 2019/079326 A1 | 4/2019 |

OTHER PUBLICATIONS

Extended European Search Report for European Patent Application No. 19856225.8 dated Apr. 25, 2022, 10 pages.

* cited by examiner

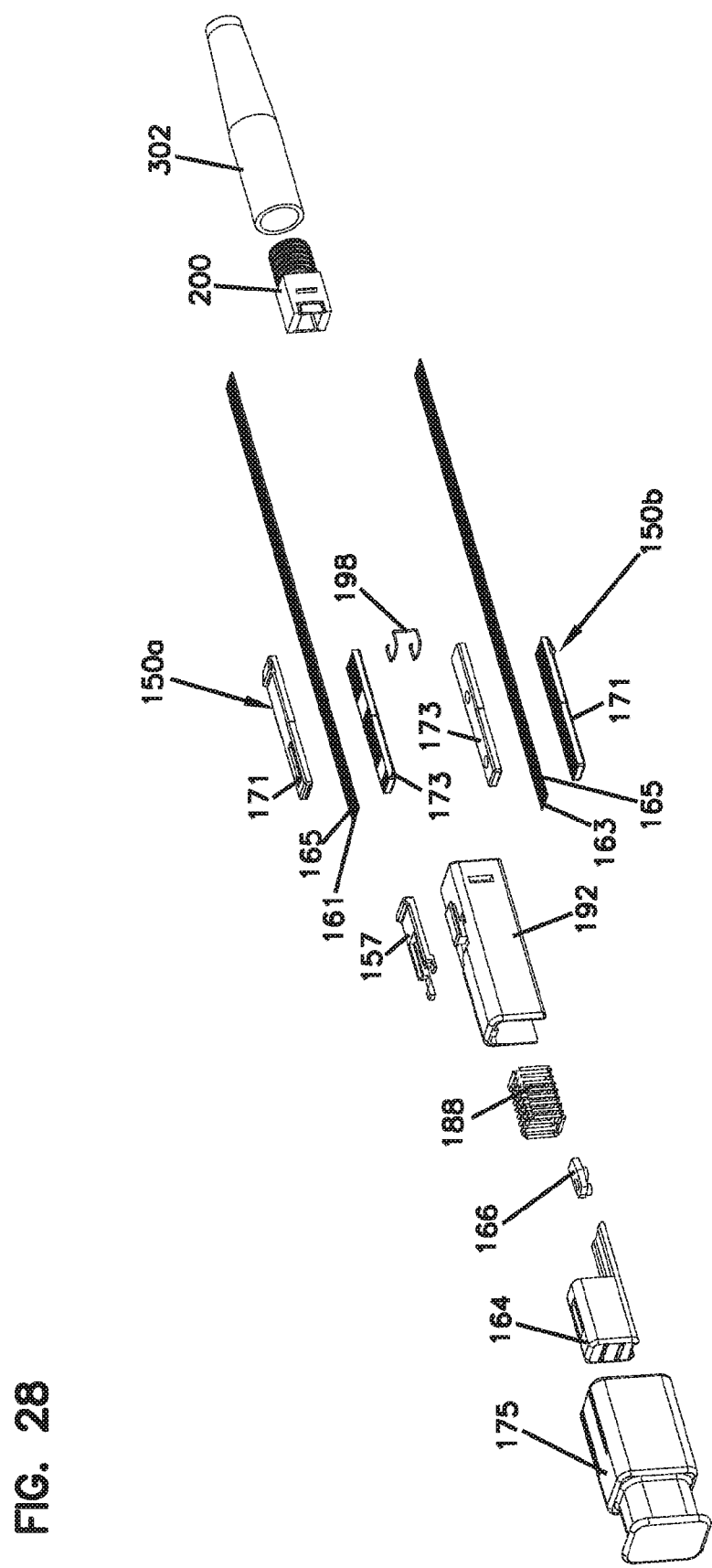

FIBER OPTIC CONNECTORS, FIBER OPTIC ADAPTERS AND RELATED FIBER OPTIC CONNECTION SYSTEMS

CROSS-REFERENCE TO RELATED APPLICATION

This application is a National Stage Application of PCT/US2019/047704, filed on Aug. 22, 2019, which claims the benefit of U.S. Patent Application Ser. No. 62/724,356, filed on Aug. 29, 2018, the disclosures of which is are incorporated herein by reference in their entireties. To the extent appropriate, a claim of priority is made to each of the above referenced applications.

TECHNICAL FIELD

The present disclosure relates generally to fiber optic connection components such as fiber optic connectors and fiber optic adapters. More particularly, the present disclosure relates to ferrule-less fiber optic connection components.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly and demateably optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles (LC, SC, MPO), alignment between two fiber optic connectors is provided through the use of an intermediate fiber optic adapter. Example LC and SC fiber optic connectors and fiber optic adapters are disclosed in U.S. Pat. Nos. 6,142,676; 7,182,524 and 8,636,425, which are hereby incorporated by reference in their entireties.

Another type of fiber optic connector can be referred to as a ferrule-less fiber optic connector. In a ferrule-less fiber optic connector, an end portion of an optical fiber corresponding to the ferrule-less fiber optic connector is not supported by a ferrule. Instead, the end portion of the optical fiber is a free end portion. Similar to the ferruled connectors described above, fiber optic adapters can be used to assist in optically coupling together two ferrule-less fiber optic connectors. Fiber optical adapters for ferrule-less connectors can include internal fiber alignment devices configured to receive bare optical fibers of ferrule-less fiber optic connectors desired to be optically coupled together and to align the fiber tips of the fiber optic connectors to enable the transfer of optical signals there between. Example ferrule-less fiber optic connectors and/or fiber optic adapters are disclosed by PCT Publication Nos. WO 2012/112344; WO 2013/117598; WO 2017/081306; WO 2016/100384; WO 2016/043922; and U.S. Pat. Nos. 8,870,466 and 9,575,272.

SUMMARY

One aspect of the present disclosure relates to a fiber optic adapter that may include an adapter body that has an adapter footprint (e.g., form factor) that is backward compatible with a conventional SC adapter mounting structure or a conventional LC adapter mounting structure or both the SC and LC adapter mounting structures. The adapter body may include first and second co-axially aligned connector ports for respectively receiving first and second fiber optic connectors. The fiber optic adapter may also include a fiber alignment structure configured to accommodate at least twelve optical fibers (e.g., non-ferrulized optical fibers) for each of the first and second connector ports. In one example, the adapter body footprint is compatible with a duplex LC mounting structure. In another example, the adapter body footprint is compatible with a simplex SC mounting structure. In certain examples, the fiber alignment structure can be configured to accommodate at least one, two, four, eight, sixteen, twenty-four, thirty-two or more optical fibers for each of the first and second connector ports. In certain examples, the fiber optic adapter utilizes ferrule-less fiber alignment technology.

Another aspect of the present disclosure relates to a fiber optic adapter with linearly movable, spring biased shutters. In certain examples, the fiber optic adapter utilizes ferrule-less fiber alignment technology. In certain examples, the fiber optic adapter contains index matching gel.

Another aspect of the present disclosure relates to a fiber optic adapter that may include an adapter body that has first and second co-axially aligned connector ports for respectively receiving first and second fiber optic connectors. The first and second connector ports are co-axially aligned along an adapter axis.

The fiber optic adapter may also include a fiber alignment structure configured to accommodate at least one optical fiber for each of the first and second connector ports. Preferably, the fiber alignment structure is configured to accommodate a plurality of optical fibers for each of the first and second connector ports. Preferably, the fiber alignment structure utilizes alignment technology for aligning non-ferrulized optical fibers.

In certain examples, the fiber optic adapter may include first and second shutters respectively corresponding to the first and second connector ports. The first and second shutters are individually linearly movable relative to the adapter body between closed positions and open positions. The first and second shutters cover a fiber receiving structure of the fiber alignment structure when in the closed positions, and allow fiber access to the fiber receiving structure when in the open positions.

The fiber optic adapter may also include a spring structure for biasing the first and second shutters toward the closed positions.

Another aspect of the present disclosure relates to a ferrule-less fiber optic connector that may include a telescopic shroud and a safety lock for locking the shroud in a fiber protecting position. It will be appreciated that the telescopic shroud is telescopically movable between the fiber protecting position where bare optical fibers of the ferrule-less fiber optic connector are recessed within the shroud, and a retracted position where the bare optical fibers protrude outwardly from the shroud. In certain examples, the safety lock can be pivotally movable between a locking position and a release position. In certain examples, the safety lock is carried with the telescopic shroud. In certain examples, a spring is used to bias the telescopic shroud toward the fiber protecting position and is also used to bias the safety lock toward a locking position.

A further aspect of the present disclosure relates to a fiber optic connector that may include an inner connector body that has a length that extends along a connector axis between a first end and a second end of the inner connector body.

The fiber optic connector may also include at least one optical fiber that extends through the length of the inner connector body. Preferably, the fiber optic connector includes at least one or a plurality of optical fibers. Preferably, the fiber optic connector is a ferrule-less fiber optic connector. It is preferred for the at least one optical fiber to have an end portion that extends axially outwardly from the first end of the inner connector body.

The fiber optic connector may also include a fiber shroud that telescopically mounts at the first end of the inner connector body. The fiber shroud is telescopically movable along the connector axis relative to the inner connector body between an extended position in which the end portion of the at least one optical fiber is recessed and protected within the fiber shroud and a retracted position in which the end portion of the at least one optical fiber protrudes axially outwardly beyond the fiber shroud.

The fiber optic connector may also include a pivotal lock that pivots about a pivot axis between a locking position in which the fiber shroud is locked in the extended position relative to the inner connector body and a release position in which the fiber shroud can be moved from the extended position to the retracted position relative to the inner connector body.

Another aspect of the present disclosure relates to a ferrule-less fiber optic connector with a spring-biased optical fiber holder. In certain examples, at least one optical fiber, or preferably a plurality of optical fibers, are secured to the optical fiber holder. In certain examples, the one or more optical fibers can be secured to the fiber holder by means such as a bonding material such as epoxy or other adhesive, clamping, fastening, crimping or other means. In certain examples, the optical fiber holder does not include structure for allowing the one or more optical fibers to buckle within the fiber holder. In certain examples, the fiber holder is axially movable relative to an outer connector body and is forwardly biased by a spring relative to the connector body.

A further aspect of the present disclosure relates to a fiber optic connector that may include an inner connector body that has a length that extends along a connector axis between a front end and a rear end of the inner connector body.

The fiber optic connector may also include at least one optical fiber that extends through the length of the inner connector body. In a preferred example, the fiber optic connector may include a plurality of optical fibers. The at least one optical fiber has a non-ferrulized end portion that extends forwardly from the front end of the inner connector body. The at least one optical fiber is secured within the inner connector body.

The fiber optic connector may also include an outer connector body mounted over the inner connector body. The outer connector body may include structure for securing the fiber optic connector within a port of a fiber optic adapter. The inner connector body is movable along the connector axis relative to the outer connector body. In a preferred example, a spring biases the inner connector body in a forward direction relative to the outer connector body.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples described herein are based.

BRIEF DESCRIPTION OF THE DRAWINGS

The accompanying drawings, which are incorporated in and constitute a part of the specification, illustrate aspects of the present disclosure and together with the description, serve to explain the principles of the disclosure. A brief description of the drawings is as follows:

FIG. 28 is an exploded view of the fiber optic connector of FIG. 24.

DETAILED DESCRIPTION

Figure 1:
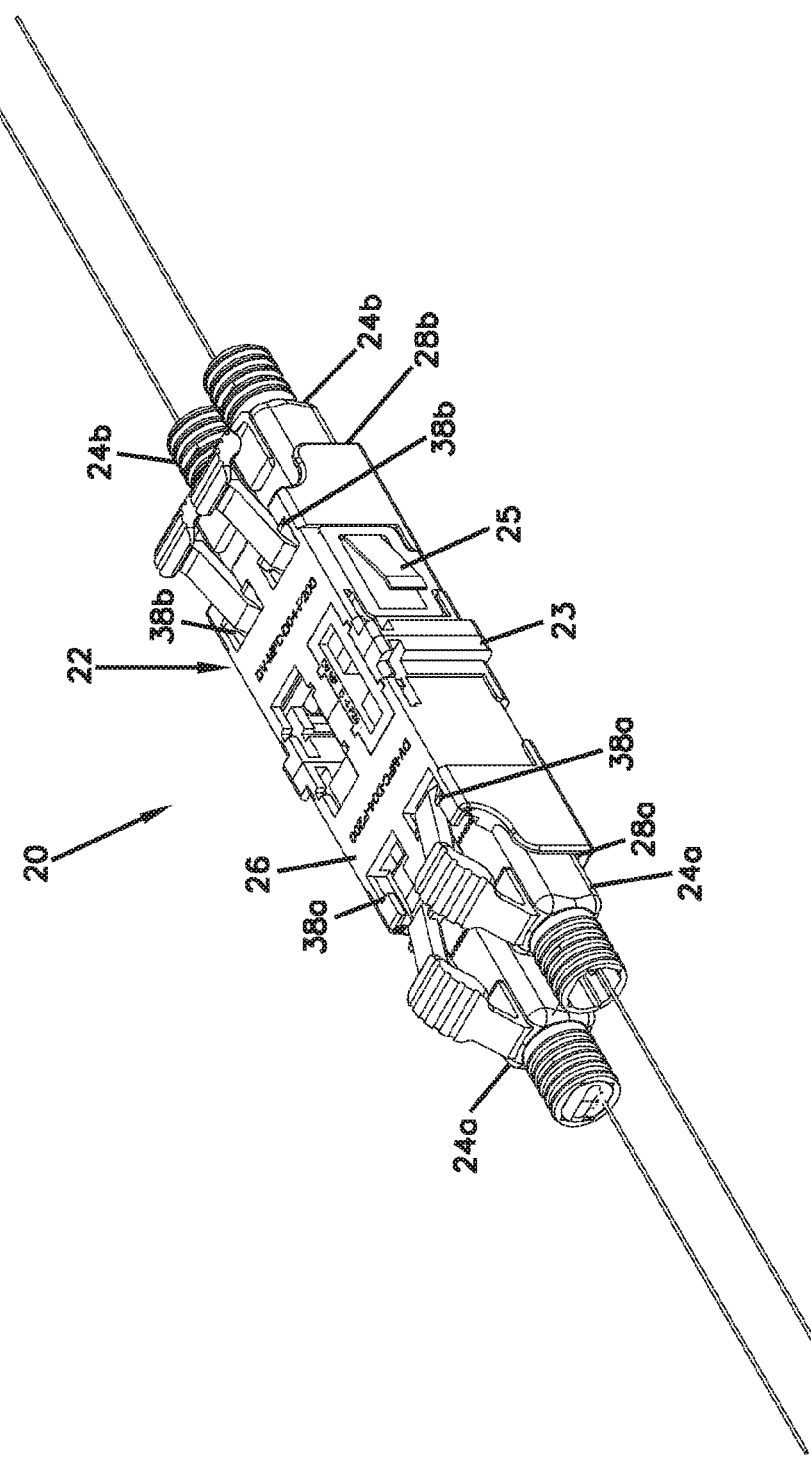
FIG. 1 is a perspective view showing a fiber optic connection system in accordance with the principles of the present disclosure.
Figure 2:
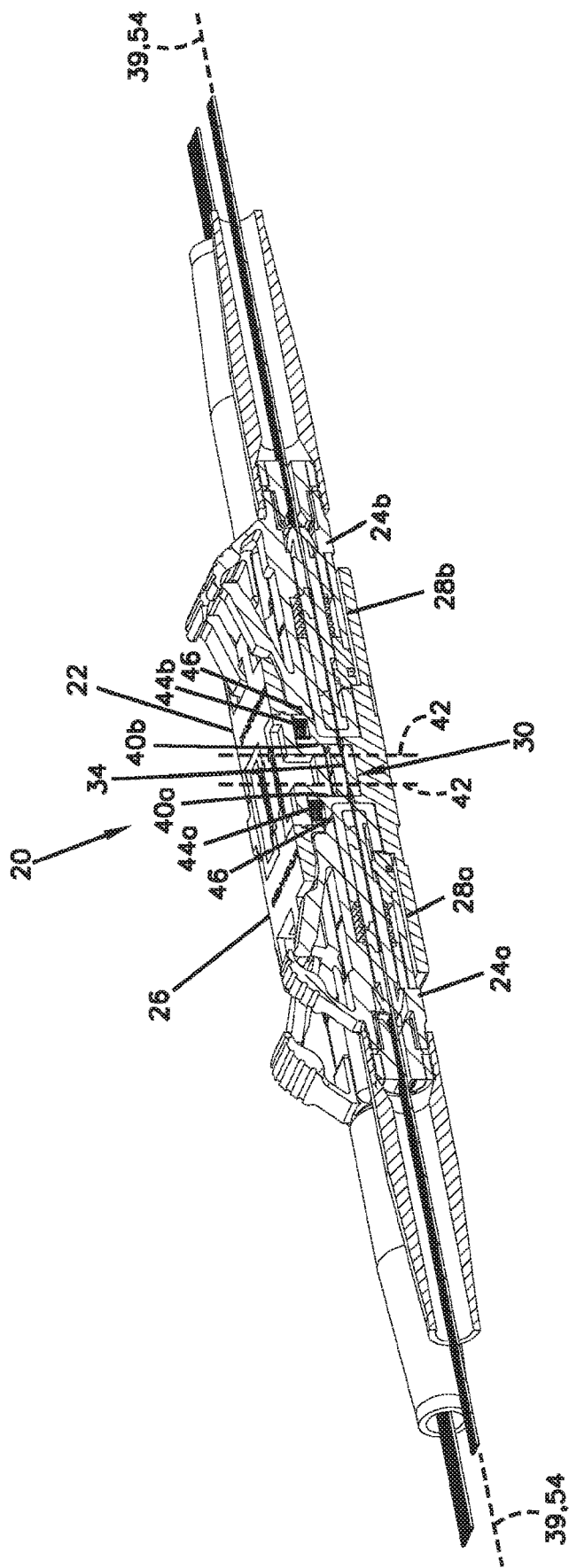
FIG. 2 is a cross-sectional view cut longitudinally through the fiber optic connection system of FIG. 1.

FIGS. 1 and 2 illustrate a fiber optic connection system 20 in accordance with the principles of the present disclosure. The fiber optic connection system 20 includes a fiber optic adapter 22 configured for coaxially aligning and optically connecting together two sets of first and second fiber optic connectors 24a, 24b. It is preferred for the fiber optic connection system 20 to have a relatively high optical fiber connection density (e.g., optical circuit density). In this regard, it is preferred for the fiber optic connection system 20 to include ferrule-less optical fiber alignment technology. Example ferrule-less optical fiber alignment technology is disclosed by International Application No. PCT/US2017/064671, which is hereby incorporated by reference in its entirety. To enhance the optical connection density of the system, it is also preferred for the fiber optic connectors 24a, 24b to be multi-fiber optical connectors. In certain examples, each of the fiber optic connectors 24a, 24b can include at least twelve optical fibers, or at least sixteen optical fibers, or at least twenty-four optical fibers, or at least thirty-two optical fibers.

In certain examples, the fiber optic adapter 22 has an adapter footprint (e.g., an adapter form factor, an adapter outer shape, an adapter size, an adapter outer profile, etc.) that is backward compatible with a conventional SC adapter mounting structure, or a conventional LC adapter mounting structure, or both the SC and LC adapter mounting structures. It will be appreciated that an SC adapter mounting structure is a structure such as a wall, panel, frame, sliding adapter pack, or like component defining an opening, slot or other receptacle for receiving a conventional SC fiber optic adapter (e.g., a simplex SC fiber optic adapter or a duplex SC fiber optic adapter). An LC adapter mounting structure is a structure such as a wall, panel, frame, sliding adapter pack, or like component defining an opening, slot or other receptacle for receiving a conventional LC adapter such as a simplex LC fiber optic adapter or a duplex LC fiber optic adapter. As depicted, the fiber optic adapter 22 is backward compatible with both a simplex SC adapter mounting structure and a duplex LC adapter mounting structure. As depicted, the fiber optic adapter 22 includes a mounting flange 23 and a mounting clip 25 configured to allow the adapter 22 to be secured within an adapter mounting opening defined by a panel.

Referring to FIGS. 1 and 2, the fiber optic adapter 22 includes an adapter body 26 having a duplex configuration including two sets of first and second coaxially aligned connector ports 28a, 28b. Each set of connector ports 28a, 28b is adapted to receive a corresponding set of the first and second fiber optic connectors 24a, 24b. The fiber optic adapter 22 also includes a fiber alignment structure 30 positioned between each set of the first and second connector ports 28a, 28b. In certain examples, the fiber alignment structures 30 are each configured to accommodate at least twelve optical fibers for each of the first and second connector ports 28a, 28b. The fiber alignment structures 30 can be configured to co-axially align non-ferrulized optical fibers corresponding to the fiber optic connectors 24a, 24b. In certain examples, fiber alignment structures in accordance with the principles of the present disclosure can be configured to accommodate multi-fiber optical connectors having a row of non-ferrulized optical fibers having a center-to-center spacing less than 260 microns, or generally about 250 microns. By accommodating a center-to-center fiber spacing of about 250 microns, each fiber alignment structure 30 can accommodate a row of twelve optical fibers while concurrently allowing the fiber optic adapter 22 to maintain a LC adapter form factor. It will be appreciated that a 250 micron center-to-center spacing corresponds generally to a standard spacing utilized by a fiber ribbon having optical fibers with coating diameters of about 250 microns. By using a center-to-center spacing smaller than 250 microns, it is possible to accommodate more than twelve fibers in a single row and still satisfy the requirement that the adapter be backward compatible with a conventional LC adapter mounting structure. For example, by using a center-to-center spacing of less than 210 microns, or about 200 microns, it is possible to accommodate a single row of sixteen optical fibers in a fiber optical alignment device while still maintaining backward compatibility with a conventional LC adapter mounting structure. It will be appreciated that optical fibers having outer coating diameters of about 200 microns can be utilized to facilitate providing the 200 micron center-to-center spacing.

Figure 3:
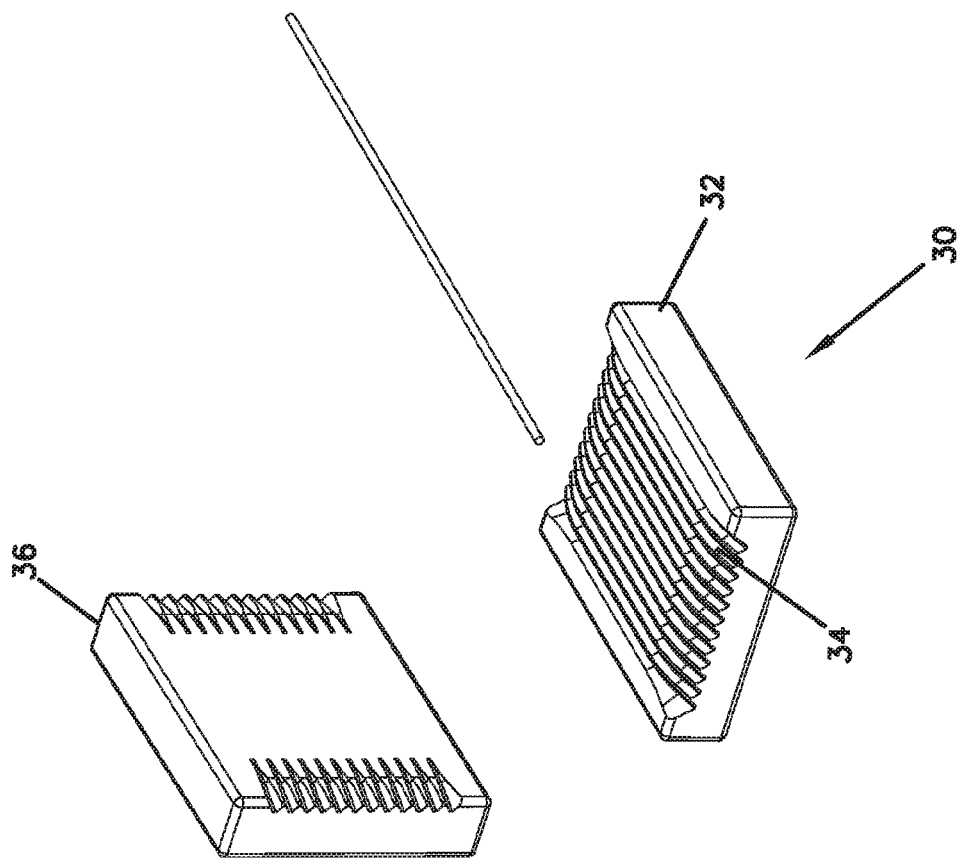
FIG. 3 depicts an example fiber alignment structure that can be utilized in the fiber optic connection system of FIG. 1 for co-axially aligning non-ferrulized optical fibers of ferrule-less fiber optic connectors of the fiber optic connection system.
Figure 4:
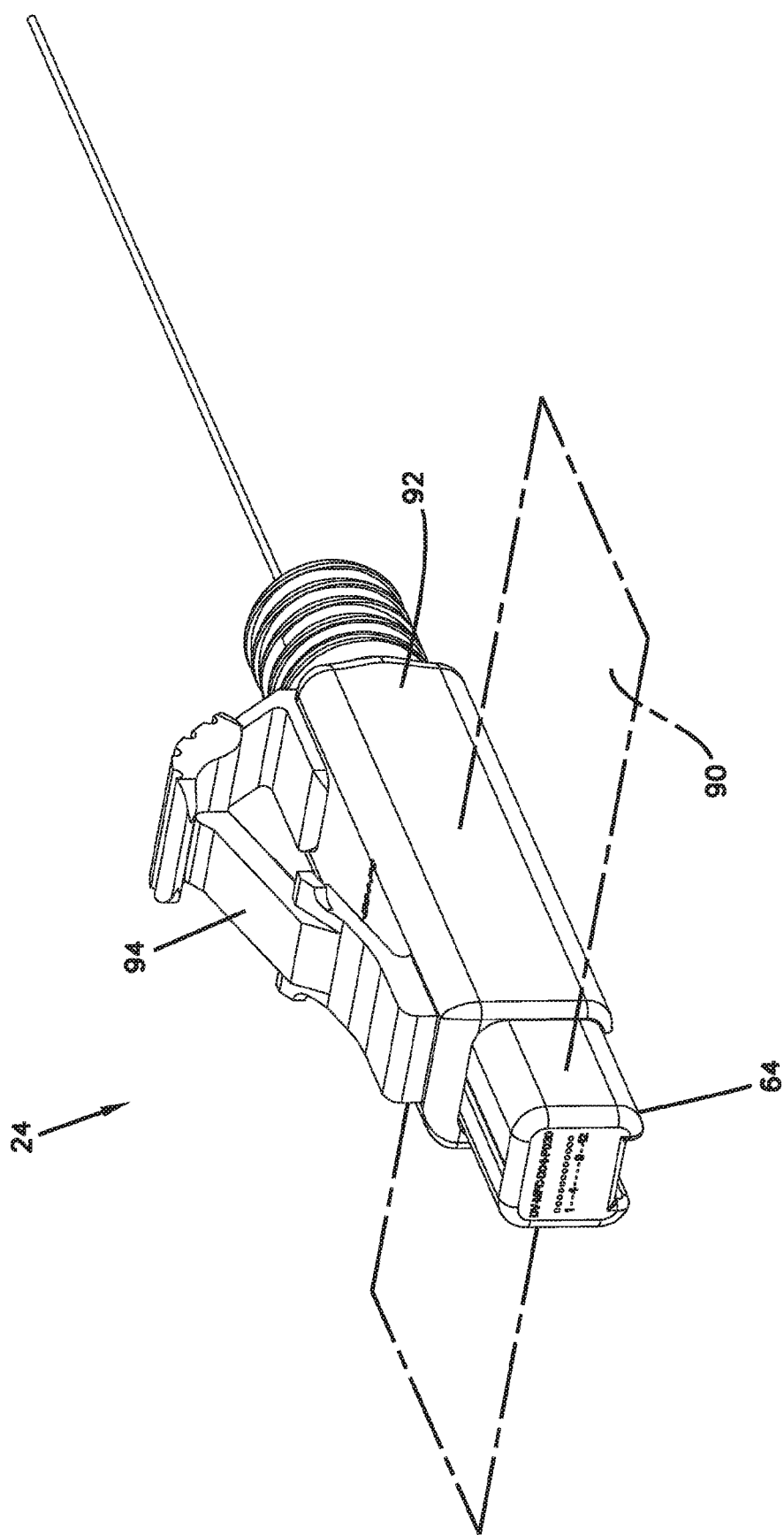
FIG. 4 is a perspective view showing a front end of one of the fiber optic connectors of the fiber optic connection system of FIG. 1.

FIG. 3 depicts one example configuration for the fiber alignment structure 30. The depicted fiber alignment structure 30 of FIG. 3 includes a first piece (e.g., an alignment piece 32; a groove-defining piece; etc.) defining a plurality of parallel alignment grooves 34. In one example, alignment grooves 34 can include twelve parallel alignment grooves having a center-to-center spacing of about 250 microns. In certain examples, the alignment grooves 34 can include V-grooves. In certain examples, each of the alignment grooves 34 can be configured to receive one optical fiber from the first fiber optic connector 24a and another optical fiber from the second fiber optic connector 24b such that the received optical fibers abut one another within the alignment grooves 34 and are co-axially aligned. In preferred examples, index matching gel can be provided within the alignment grooves 34 to provide enhanced optical connections and to provide cleaning of the optical fibers as needed. In certain examples, the alignment grooves 34 can be referred to as fiber receiving structures or like terms. The fiber alignment structure 30 further includes a second piece (e.g., a cover piece 36) that mounts adjacent to the alignment piece 32 and covers open sides of the alignment grooves 34. When the cover piece 36 and the alignment piece 32 are mounted together, the pieces 32, 36 cooperate to define rigid passages (e.g., rigid sized grooves, rigid sized openings, rigid sized fiber receivers) in which the optical fibers of the fiber optic connectors 24a, 24b are received and co-axially aligned. It will be appreciated that two of the fiber alignment structures 30 are mounted within the fiber optic adapter 22, with each of the fiber alignment structures 30 corresponding to one of the two sets of fiber optic connector ports 28a, 28b.

In certain examples, the adapter body 26 includes a main body defining the first and second connector ports 28a, 28b. Each set of first and second connector ports 28a, 28b is coaxially aligned along an adapter axis 39 (see FIG. 8). The main body also defines first and second fixed latch catches 38a, 38b (see FIG. 1) respectively corresponding to the first and second connector ports 24a, 24b. The first and second fixed latch catches 38a, 38b are configured for engaging cantilever latches of the first and second fiber optic connectors 24a, 24b for retaining the first and second fiber optic connectors 24a, 24b within their respective first and second connector ports 28a, 28b.

Referring to FIG. 2, the fiber optic adapter 22 includes first and second shutters 40a, 40b respectively corresponding to the first and second connector ports 28a, 28b of each set of first and second connector ports 28a, 28b. The first and second shutters 40a, 40b are individually linearly movable relative to the adapter body 26 between closed positions and open positions (see FIG. 2). The first and second shutters 40a, 40b cover the fiber receiving structures of the fiber alignment structures 30 when in the closed positions. In the example of FIG. 2, the shutters 40a, 40b are slid downwardly to block access to the fiber alignment structures 30 when in the closed positions. The fiber alignment structures 30 are positioned axially between the first and second shutters 40a, 40b. When the first and second shutters 40a, 40b are in the open positions, fiber access is allowed with respect to the fiber receiving portions of the alignment pieces 32. For example, when the first and second shutters 40a, 40b are open, non-ferrulized optical fibers corresponding to the first and second fiber optic connectors 24a, 24b are permitted to extend past the shutters 40a, 40b and into the alignment grooves 34 of the fiber alignment structures 30.

In certain examples, the first and second shutters 40a, 40b are linearly movable along reference planes 42 that are perpendicular relative to the adapter axes 39 In certain examples, a spring structure is used for biasing the first and second shutters 40a, 40b toward the closed positions. In certain examples, the spring structure can include separate coil springs 44a, 44b corresponding to each of the first and second shutters 40a, 40b. In certain examples, the fiber optic adapter 22 can include structure for causing the shutters 40a, 40b to move from the closed positions to the open positions when fiber optic connectors are inserted within the respective connector ports 28a, 28b. For example, the first and second shutters 40a, 40b can include ramps 46 that are engaged by the front ends of the fiber optic connectors 24a, 24b when the fiber optic connectors 24a, 24b are inserted within their respective connector ports 28a, 28b. When the fiber optic connectors 24a, 24b are inserted into the connector ports 28a, 28b, contact between the front ends of the connectors 28a, 28b and the ramps 46 causes the shutters 40a, 40b to move upwardly from the closed positions to the open positions. Contact between the fiber optic connectors 24a, 24b and the ramps 46 maintains the shutters 40a, 40b in the open positions while the fiber optic connectors 24a, 24b remain fully inserted within their corresponding connector ports 28a, 28b. When the fiber optic connectors 24a, 24b are withdrawn from their corresponding connector ports 28a, 28b, the fiber optic connectors 24a, 24b disengage from the ramps 46 and the springs 44a, 44b move the shutters 40a, 40b downwardly from the open positions back to the closed positions. In certain examples, the shutters 40a, 40b can assist in containing index matching gel or other material within the fiber alignment structures 30, and also can prevent dust or other contamination from entering the fiber alignment structures 30.

FIGS. 4-7 depict one of the fiber optic connectors 24a, 24b (referenced generally by reference numeral 24). The fiber optic connector 24 includes an inner connector body 50 having a length that extends along a connector axis 54 between a first end 56 (e.g., a front end) and a second end 58 (e.g., a rear end). The fiber optic connector 24 includes a plurality of optical fibers 60 that extend through the length of the inner connector body 50. The optical fibers 60 include forward end portions 62 that extend axially outwardly from the first end 56 of the inner connector body 50. The fiber optic connector 24 also includes a fiber shroud 64 that telescopically mounts at the first end 56 of the inner connector body 50. The fiber shroud 64 is telescopically movable along the connector axis 54 relative to the inner connector body 50 between an extended position (see FIG. 5) and a retracted position (see FIG. 6). When the fiber shroud 64 is in the extended position of FIG. 5, the end portions 62 of the optical fibers 60 are recessed and protected within the fiber shroud 64. It will be appreciated that the fiber shroud 64 can include at least one opening, and optionally a plurality of openings, for receiving the end portions 62 of the optical fibers 60 when the fiber shroud 64 is moved to the retracted position. When the fiber shroud 64 is in the retracted position of FIG. 6, the end portions 62 of the optical fibers 60 protrude axially outwardly (e.g., forwardly) beyond the fiber shroud 64 and pass through the opening or openings defined by the fiber shroud 64.

Figure 8:
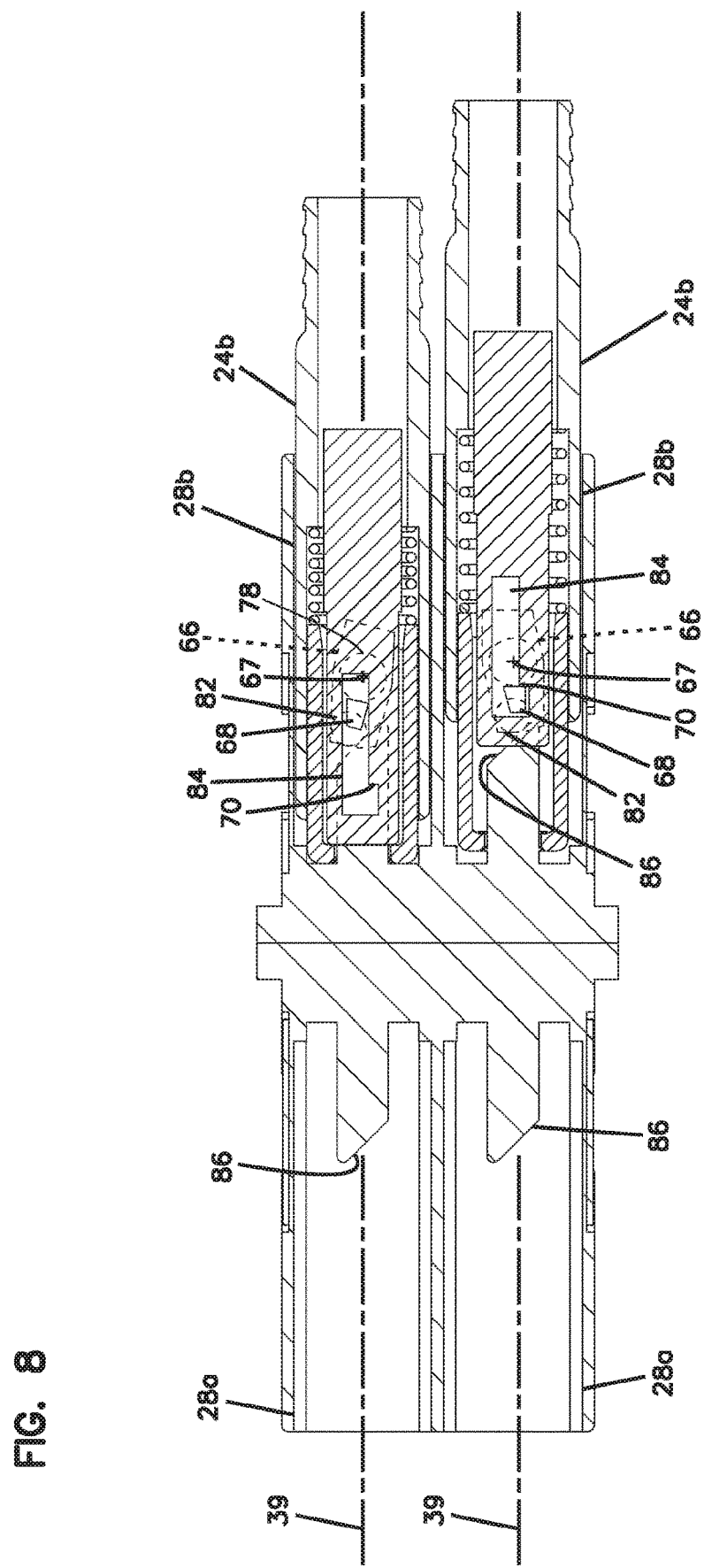
FIG. 8 is a top, cross-sectional view showing a shroud safety-lock configuration utilized by the fiber optic connection systems of FIG. 1.

Referring to FIGS. 5-9, the fiber optic connector 24 further includes a pivotal lock 66 that pivots about a pivot axis 67 between a locking position in which the fiber shroud 64 is locked in the extended position relative to the connector body 50, and a release position in which the fiber shroud 64 can be moved from the extended position to the retracted position relative to the inner connector body 50. In certain examples, the pivotal lock 66 is carried with the fiber shroud 64 as the fiber shroud moves between the extended and retracted positions. In certain examples, the pivotal lock 66 is pivotally connected to the fiber shroud 64. In certain examples, the pivotal lock 66 includes an engagement portion 68 that engages a catch 70 defined by the inner connector body 50 when the fiber shroud 64 is in the extended position and the pivotal lock 66 is in the locking position. The inner connector body 50 also includes an axial slot 84 adjacent to the catch 70. The catch 70 and the slot 84 are shown at FIG. 8.

Figure 5:
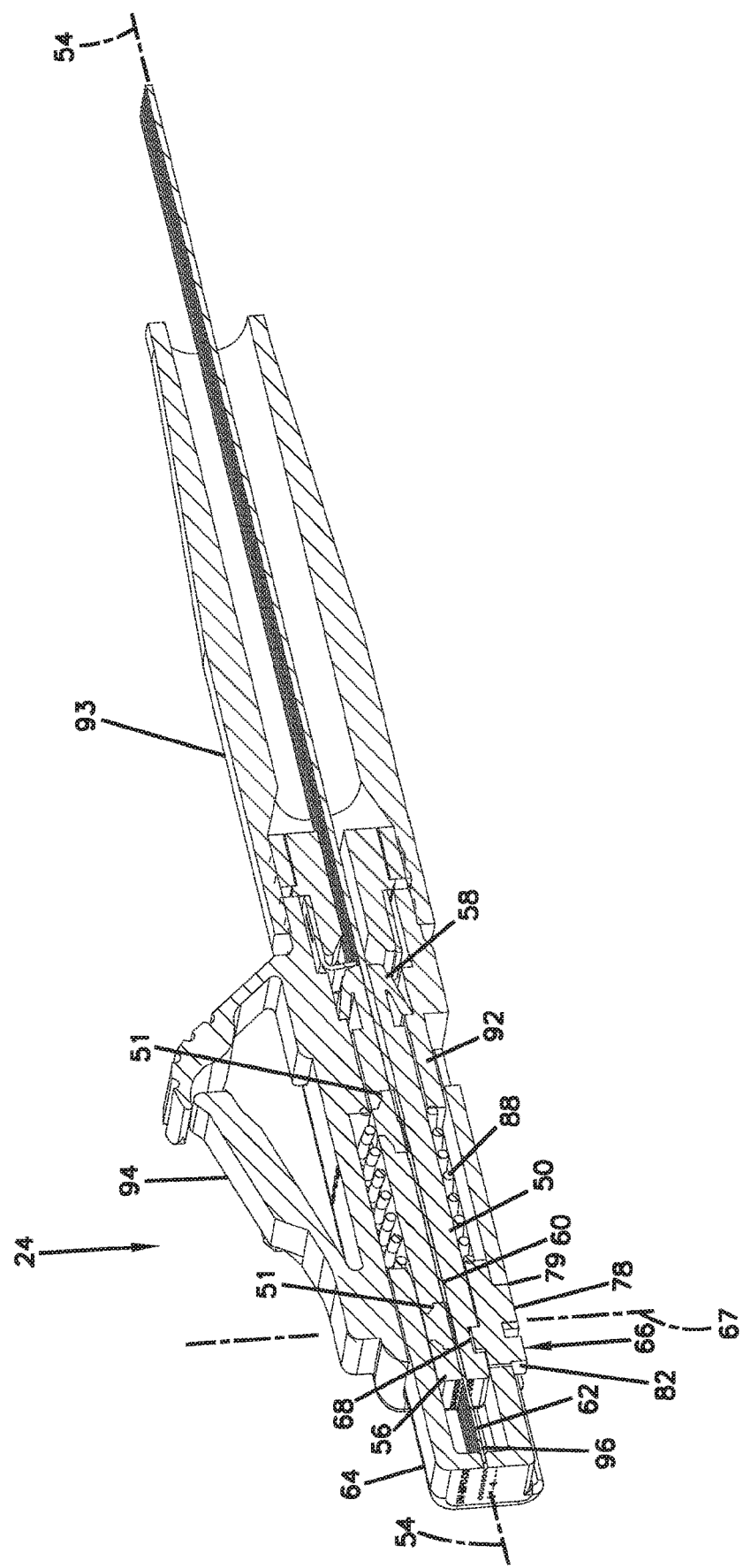
FIG. 5 is a cross-sectional view cut longitudinally through the fiber optic connector of FIG. 4 showing a shroud of the fiber optic connector in an extended position.
Figure 6:
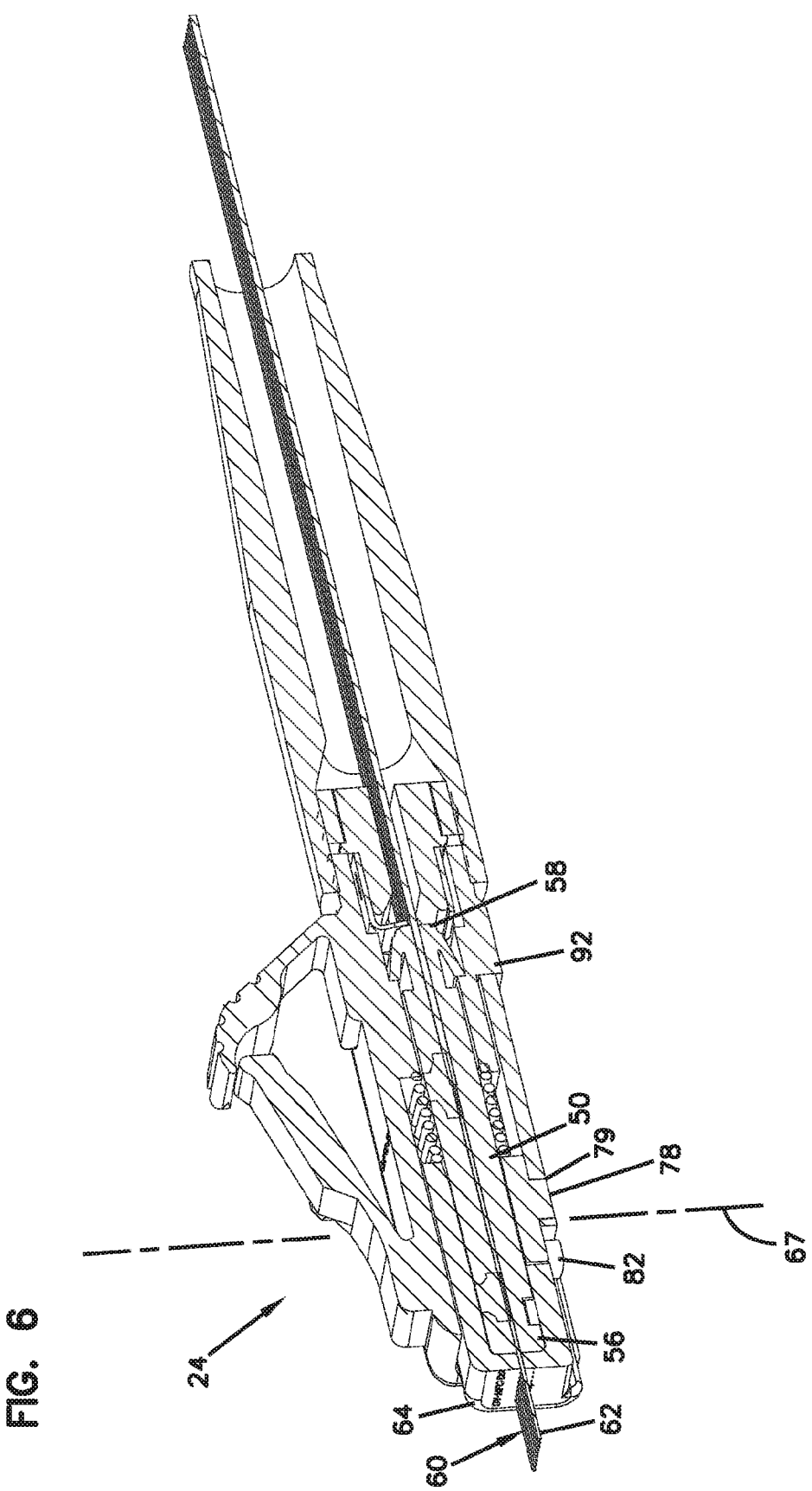
FIG. 6 is a cross-sectional view showing the fiber optic connector of FIG. 5 with the shroud in a retracted position.
Figure 7:
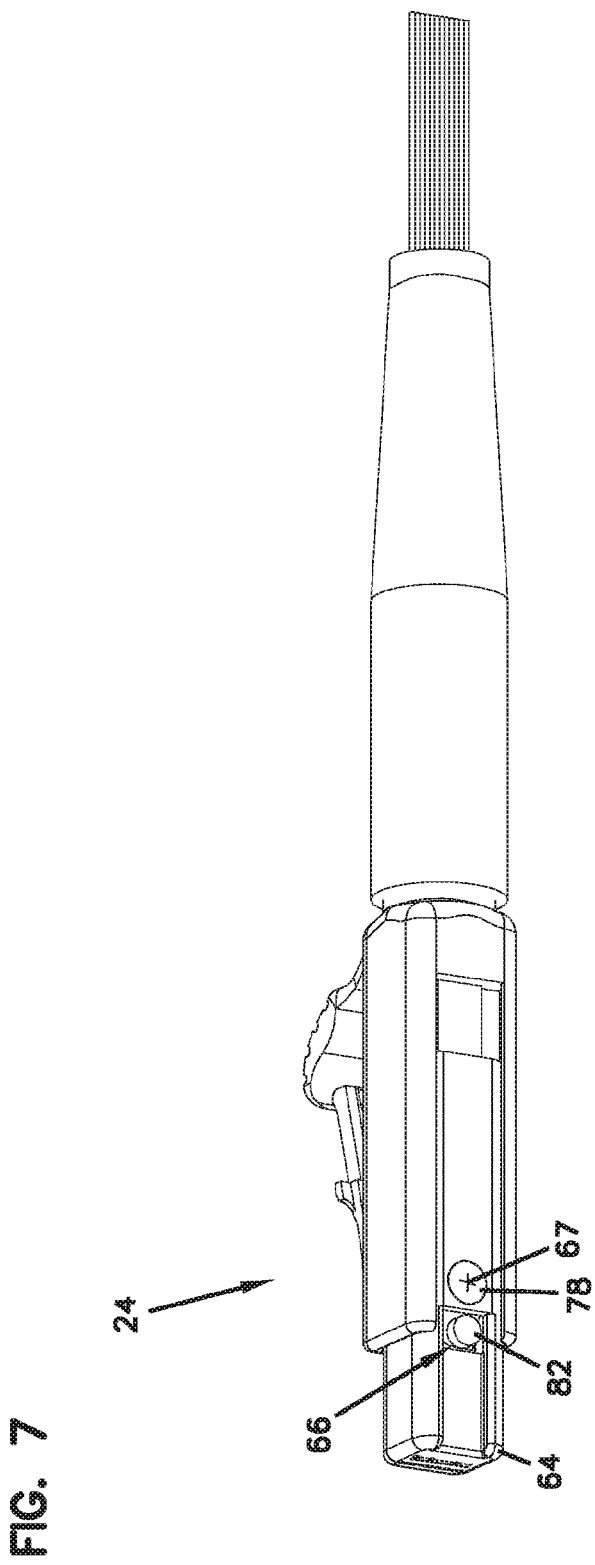
FIG. 7 is a bottom view of the fiber optic connector of FIG. 4.
Figure 9:
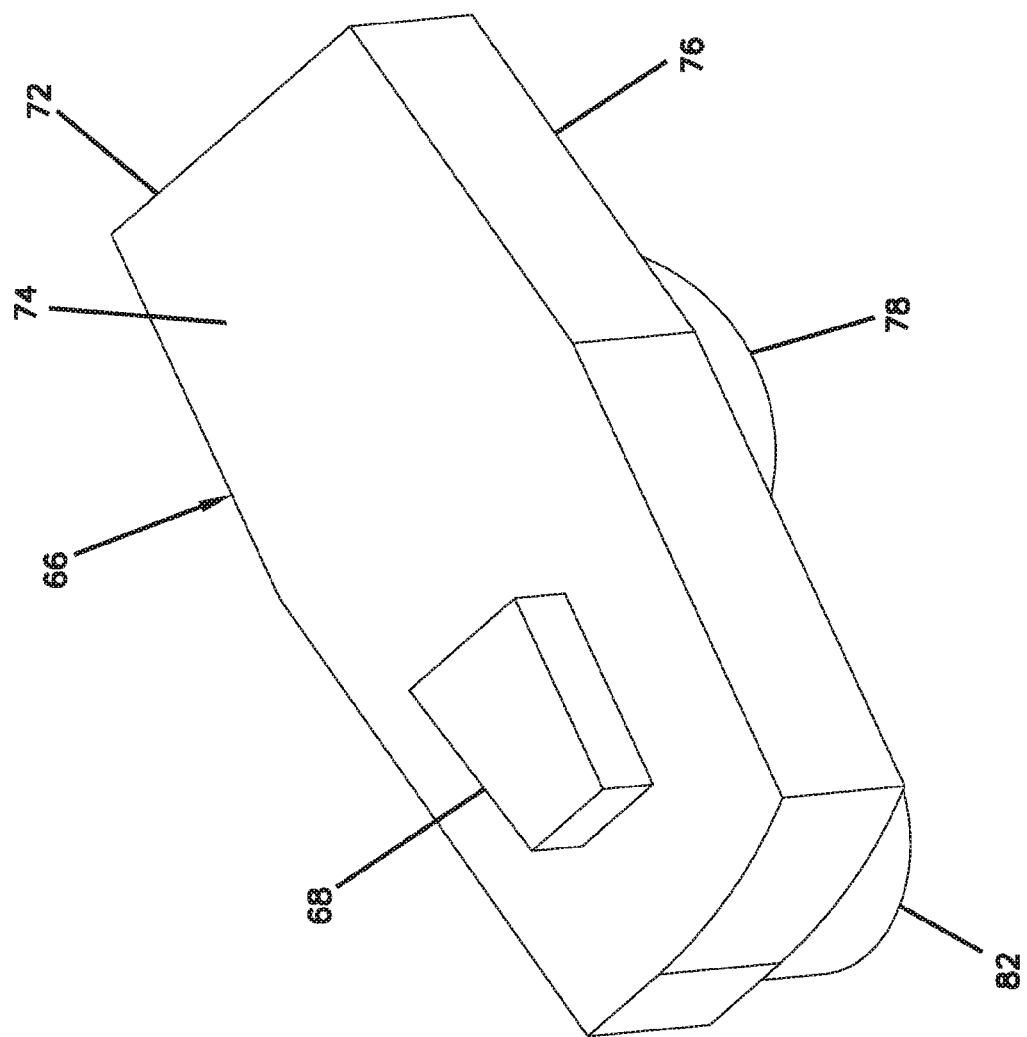
FIG. 9 is a perspective view showing one of the safety locks of FIG. 8 in isolation from the remainder of the system.

As shown at FIGS. 5 and 9, the pivotal lock 66 includes a main body 72 having a top side 74 and a bottom side 76. The engagement portion 68 projects upwardly from the top side 74. A pivot element 78 and a trigger member 82 (e.g., a trigger post) project from the bottom side 76. The pivot element 78 fits within a pivot receptacle 79 defined by the shroud 64 and is centered within the receptacle 79 to allow the pivot element 78 to pivot within the receptacle 79 about the pivot axis 67. The fiber optic adapter 22 includes ramps 86 within the connector ports 28a, 28b for causing the pivotal locks 66 to pivot from the locking positions to the release positions when the fiber optic connectors 24a, 24b are inserted within their respective ports 28a, 28b. When the fiber optic connectors 24a, 24b are inserted in the connector ports 28a, 28b, the trigger members 82 engage the ramps 86 causing the pivotal locks to pivot relative to the shrouds 64 about the pivot axes 67 from the locking positions to the release positions. When the pivotal locks 66 pivot from the locking positions to the release positions, the engagement portions 68 disengage from the catches 70 of the inner bodies 50. Once the engagement portions 68 disengage from the catches 70, continued inward insertion of the fiber optic connectors 24a, 24b into the connector ports 28a, 28b causes the shrouds 64 to slide from the extended position to the retracted position via contact with the shutters 44a, 44b. As the shrouds 64 slide between the extended and retracted positions, the engagement portions 68 to slide within the axial slots 84. During the connector insertion process, the shrouds 64 can initially contact the shutter ramps 46 causing the shutters 44 to move from the closed positions to the open positions. Once the shutters 44 have opened and the connector insertion process continues, the shrouds 64 can engage main bodies of the shutters 44 causing the shrouds 64 to move from the extended positions toward the retracted positions. It will be appreciated that movement of the pivotal locks 66 from the locking positions to the release positions is coordinated with contact of the shrouds 64 with the main bodies of the shutters 44 such that the pivotal locks 66 unlock before the shrouds begin to retract.

During the connector insertion process, a sequence of events occurs which includes opening of the shutter 44, movement of the pivotal lock 66 from the locking position to the release position, retraction of the shroud 64, and extension of the end portions of the optical fibers 60 through the shroud 64 and past the shutter 44 into the alignment groove 34 of the fiber alignment device 30. During the connector withdrawal process, a sequence of events occurs which includes extension of the shroud 64, retraction of the optical fibers 60 into the shroud and the concurrent withdrawal of the optical fibers 60 from the alignment grooves 34 of the fiber alignment device 30, closing of the shutter 44, and movement of the pivotal lock 66 from the release position to the locking position once the shroud has been fully extended.

Referring to FIG. 8, the lower depicted fiber optic connector 24 is only partially inserted within its corresponding connector port 28 so that the trigger member 82 has not yet engaged the ramp 86 and the pivotal lock 66 remains in the locking position. In contrast, the upper fiber optic connector 24 depicted at FIG. 8 has been fully inserted within its corresponding fiber optic connector port 28 such that contact between the ramp surface 86 and the trigger member 82 has caused the corresponding pivotal lock 66 to move to the release position thereby disengaging the engagement portion 68 from the catch 70 and allowing the engagement portion 68 to slide along the axial slot 84.

Referring to FIG. 5, the fiber optic connector 24 further includes a spring 88 (e.g., a coil spring) that mounts around the inner connector body 50 and functions to bias the fiber shroud 64 toward the extended position and also functions to bias the pivotal lock 66 toward the locked position. Referring still to FIG. 5, the fiber optic connector 24 includes a top, a bottom, a left side and a right side. The optical fibers 60 are arranged in a row that extends along a reference plane 90 (see FIG. 4) that extends through the left and right sides of the fiber optic connector and is located between the top and bottom sides of the fiber optic connector 24. The pivotal lock 68 is located at the bottom side of the fiber optic connector 24.

The fiber optic connector 24 further includes an outer connector body 92 mounted over the fiber shroud 64 and over the inner connector body 50. The outer connector body 92 includes structure for securing the fiber optic connector 24 within one of the ports 28 of the fiber optic adapter 22. In the depicted example, the structure includes a flexible latching arm 94 (e.g., an LC latching arm) having latching portions adapted to engage the latch catches 38 of the fiber optic adapter 22 when the fiber optic connector 24 is fully inserted within its corresponding connector port 28. When the connector 24 is latched within a corresponding one of the adapter ports, the spring 88 biases the mechanical reference planes corresponding to the catches 38 and the engagement portions of the latching arms 94 against one another to absorb any tolerances between the fiber optic connector 24 and the fiber optic adapter 22. In certain examples, the outer connector body 92 includes a top side, a left side, a right side and an open bottom side configured for exposing the pivotal lock 66. In certain examples, the spring 88 is mounted over the inner connector body 50 and is captured axially between the outer connector body 92 (e.g., an inner shoulder of the outer connector body 92) and the fiber shroud 64. In certain examples, a rear end of the spring 88 engages the inner shoulder of the outer connector body 92 and a front end of the spring 88 engages the fiber shroud 64 and the pivotal lock 66.

Figure 10:
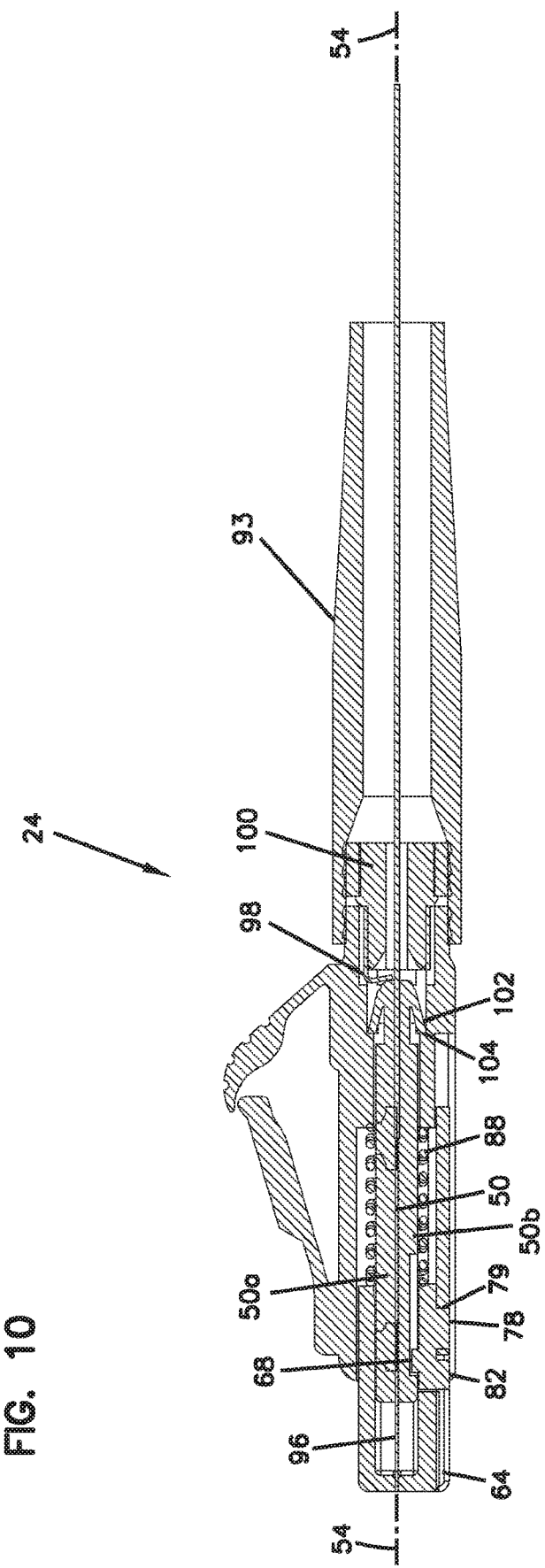
FIG. 10 is another longitudinal cross-sectional view through the fiber optic connector of FIG. 4.
Figure 11:
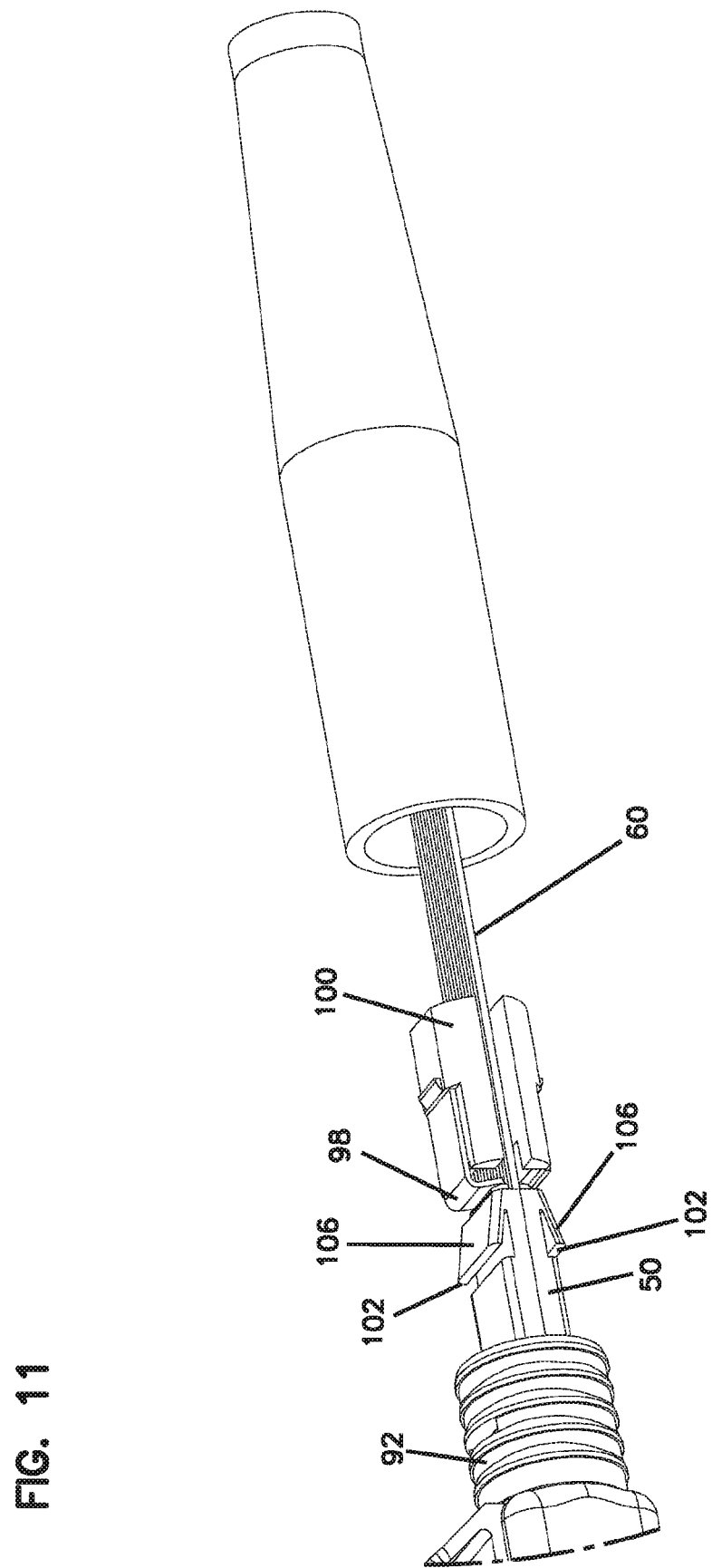
FIG. 11 is an exploded view showing a spring-biasing arrangement for forwardly biasing a fiber holder of the fiber optic connector of FIG. 4.
Figure 12:
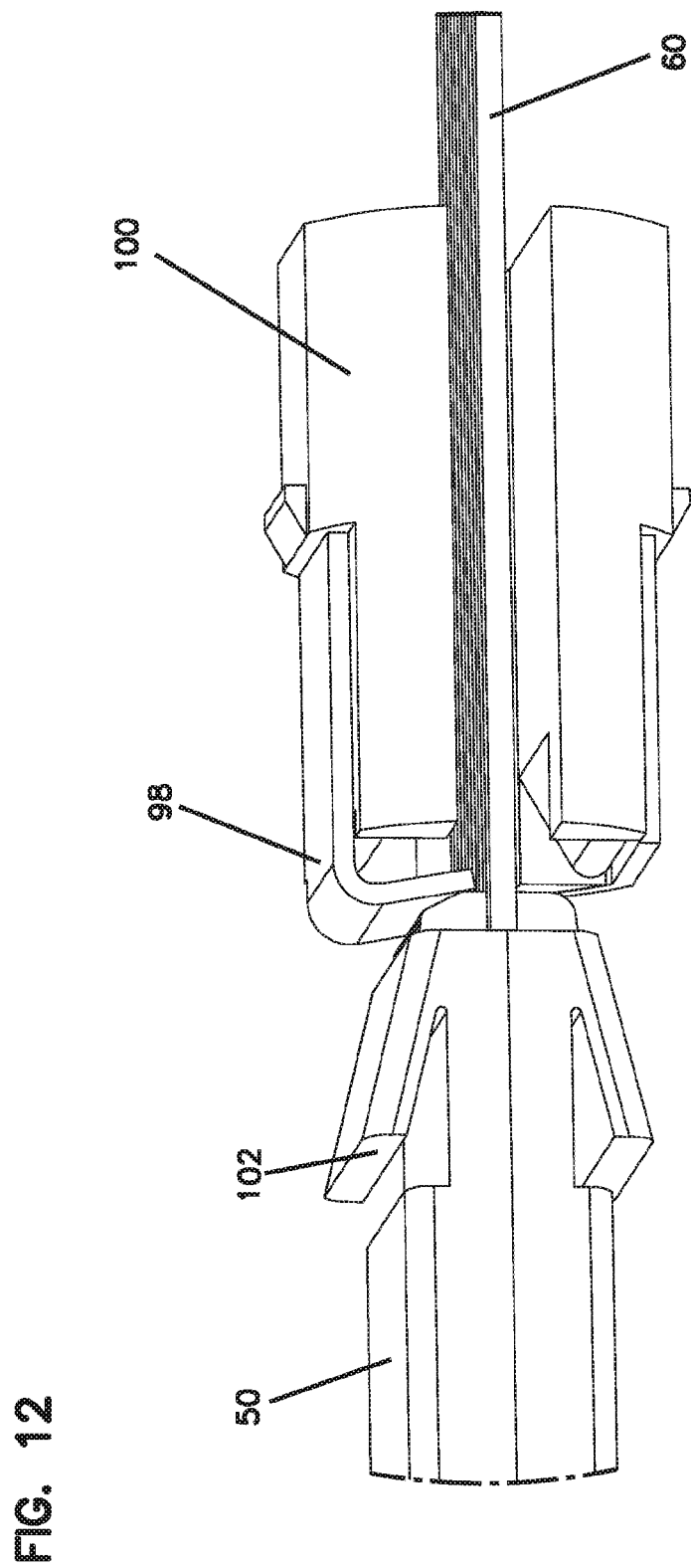
FIG. 12 is an enlarged side view of the spring-biasing arrangement of FIG. 11.

Referring to FIG. 10, the optical fibers 60 extend through the length of the inner connector body 50. The optical fibers 60 include non-ferrulized end portions 96 (e.g., bare fiber portions) that extend forwardly from the first end 56 of the inner connector body 50. The optical fibers 60 are preferably secured within the inner connector body 50. For example, a bonding material such as epoxy or other adhesive can be used to secure the optical fibers 60 within the inner connector body 50. In certain examples, the inner connector body 50 functions as a fiber holder and can include first and second pieces between which the optical fibers 60 are secured. In certain examples, the inner connector body 50 can be used as a jig during assembly operations for facilitating handling the optical fibers. Other fiber optic connectors including fiber holders are disclosed in U.S. Provisional Patent Application No. 62/573,625, entitled Fiber Optic Connector with Modular Fiber Carriers, filed on Oct. 17, 2017, which is hereby incorporated by reference in its entirety.

The inner connector body 50 is movable along the connector axis 54 relative to the outer connector body 92. In one example, a spring 98 is used for biasing the inner connector body 50 in a forward direction relative to the outer connector body 92. In certain examples, the spring 98 can be a leaf spring. In other examples, the spring 98 can be a coil spring or other type of element having elastic characteristics. In certain examples, the spring 98 is attached to or mounted to a rear connector body 100 that attaches to the rear end of the outer connector body 92. In certain examples, the optical fibers can each be bonded to the inner connector body 50 at multiple separate locations along the length of the inner connector body 50. In certain examples, the inner connector body 50 lacks structure for allowing the optical fibers 60 to buckle within the inner connector body and the optical fibers are configured to not buckle within the inner connector body 50 when a connection is made between two fiber optic connectors 24a, 24b. Instead, the ability of the inner connector body 50 to move axially within the outer connector body 92 and the resilience provided by the spring 98 provides the necessary spring loading for maintaining end-to-end contact between the fiber end portions of the optical fibers that are optically connected by the adapter 22. When an optical connection is made, contact between the abutting optical fibers with the alignment structure 30 forces the inner connector bodies 50 of the fiber optic connectors 24a, 24b in rearward directions against the bias of the springs 98. The spring forces of the springs 98 urge the fiber ends of the connectors 24a, 24b toward one another insuring that contact is maintained between the abutting end faces of the optical fibers being aligned by the fiber alignment device 30.

In certain examples, the inner connector body 50 includes a first stop 102 that engages a second stop 104 of the outer connector body 92 to limit forward movement of the inner connector body 50 relative to the outer connector body 92. Example structures that can form stops include surfaces, tabs, shoulders, flanges, walls or like structures. In the depicted example, the second stop 104 is defined by an inner shoulder formed within the outer connector body 92, and the first stop 102 is defined by a plurality of angled, resilient arms 106. The configuration of the resilient arms 106 allows the inner connector body 50 to be loaded axially into the outer connector body 92 through either the forward end or the rearward end of the outer connector body 92. The resilient arms 106 are angled outwardly relative to the connector axis 54 and have free outer ends that abut against the second stop 104.

Figure 13:
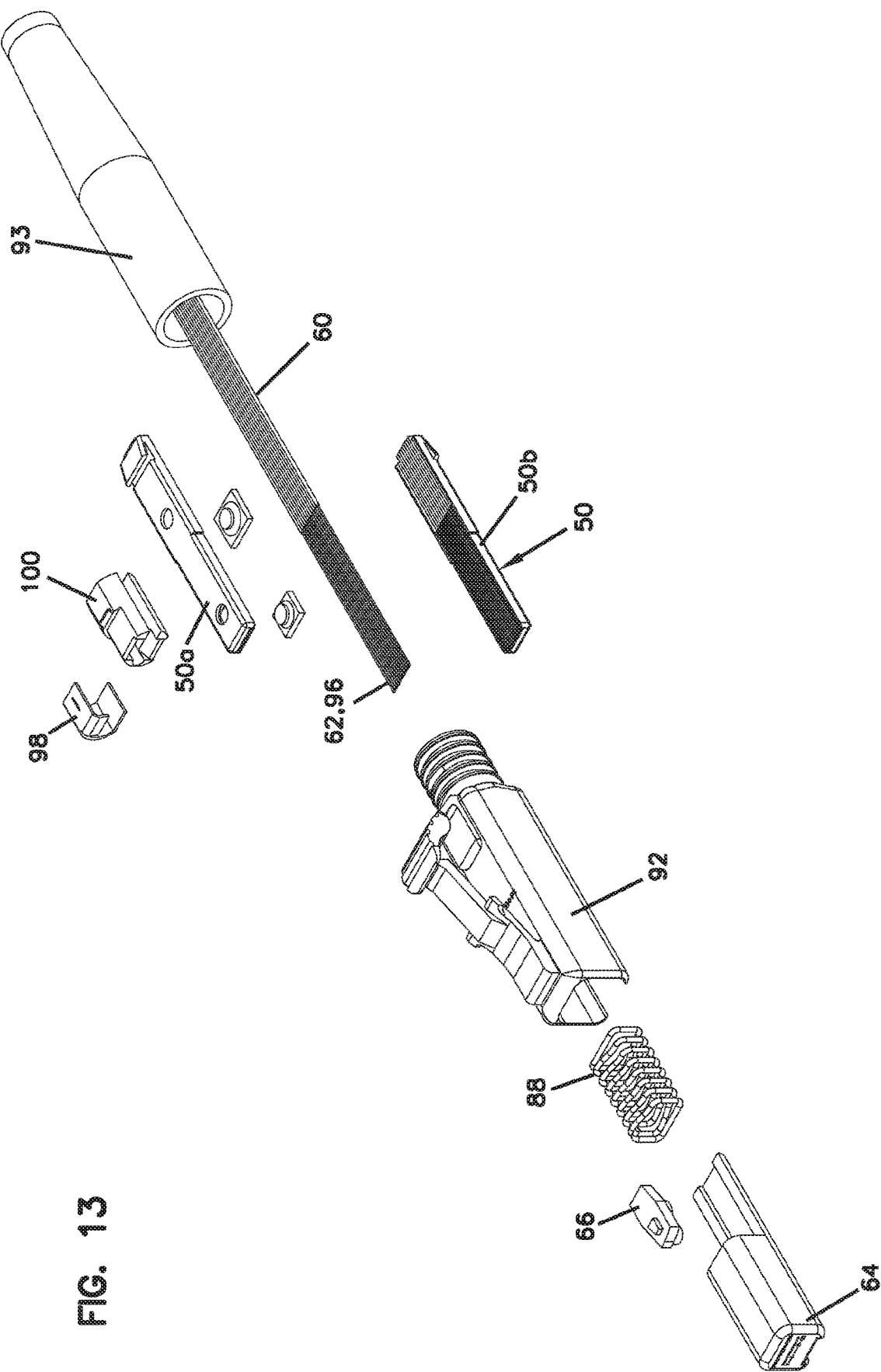
FIG. 13 is an exploded view of the fiber optic connector of FIG. 4.

Referring to FIG. 13, to assemble the fiber optic connector 24, the optical fibers 60 are initially bonded between upper and lower pieces 50a, 50b of the inner connector body 50 with the end portions 62 projecting forwardly beyond the first end 56 of the connector body 50. At least one of the upper and lower pieces can optionally include axial grooves for receiving the optical fibers. The fiber 60 can be bonded to the inner connector body 50 at one or more bonding locations which may include receptacles 51 defined in the inner connector body 50 for receiving bonding material. Next, the spring 98 is mounted to the rear connector body 100. The rear connector body 100 is then inserted over the optical fibers 60. To facilitate inserting the rear connector body 100 over the optical fibers 60, the rear connector body 100 can have a wrap-around configuration with an open side for receiving the optical fibers 60. The inner connector body 50 with the optical fibers 60 secured thereto is then inserted into the outer connector body 92 and the rear connector body 100 is snapped into the rear end of the outer connector body 92. Thereafter, the shroud spring 88 is inserted into the outer connector body 92 over the inner connector body 50, and the pivotal lock 66 is loaded into the shroud 64 with the pivot element 78 received within the pivot receptacle 79. The fiber shroud 64 can then be loaded into (e.g., snapped into) the outer connector body 92. Finally, a boot 93 can be mounted at the rear end of the connector and a dust cap (not shown) can be mounted over the front end of the fiber shroud 64. In another example, the pivotal lock 66, the fiber shroud 64, and the shroud spring 88 can be pre-assembled together and then loaded into the outer connector body 92 as a unit.

Figure 14:
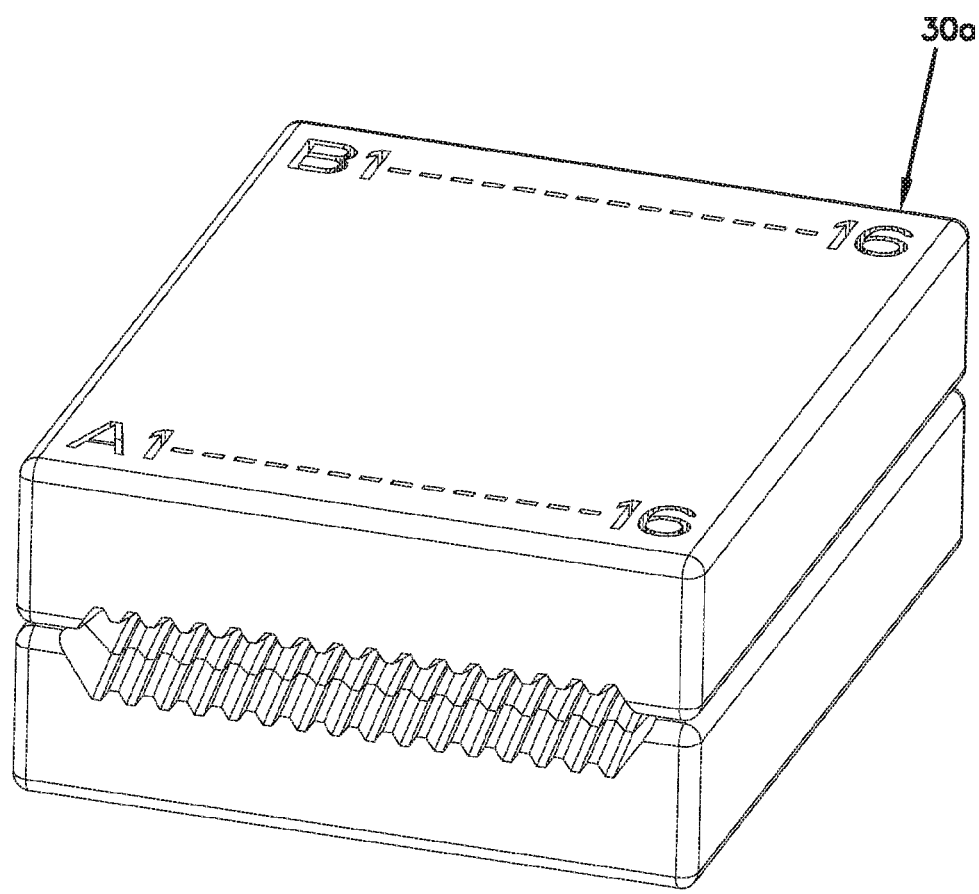
FIG. 14 is a perspective view showing another optical fiber alignment structure suitable for use with the fiber connection system of FIG. 1, the optical fiber alignment system is adapted for co-axially aligning a plurality of ferrule-less (e.g., bare) optical fibers corresponding to multi-fiber, ferrule-less fiber optic connectors.

FIG. 14 shows an alternative fiber alignment structure 30a having sixteen V-grooves for aligning sixteen pairs of optical fibers. It will be appreciated that a first set of sixteen optical fibers can be inserted into one end of the fiber alignment structure 30a while a second set of sixteen optical fibers can be inserted into the opposite end of the fiber alignment structure 30a. In the depicted example, the V-grooves can have a center-to-center spacing of about 200 microns.

Figure 15:
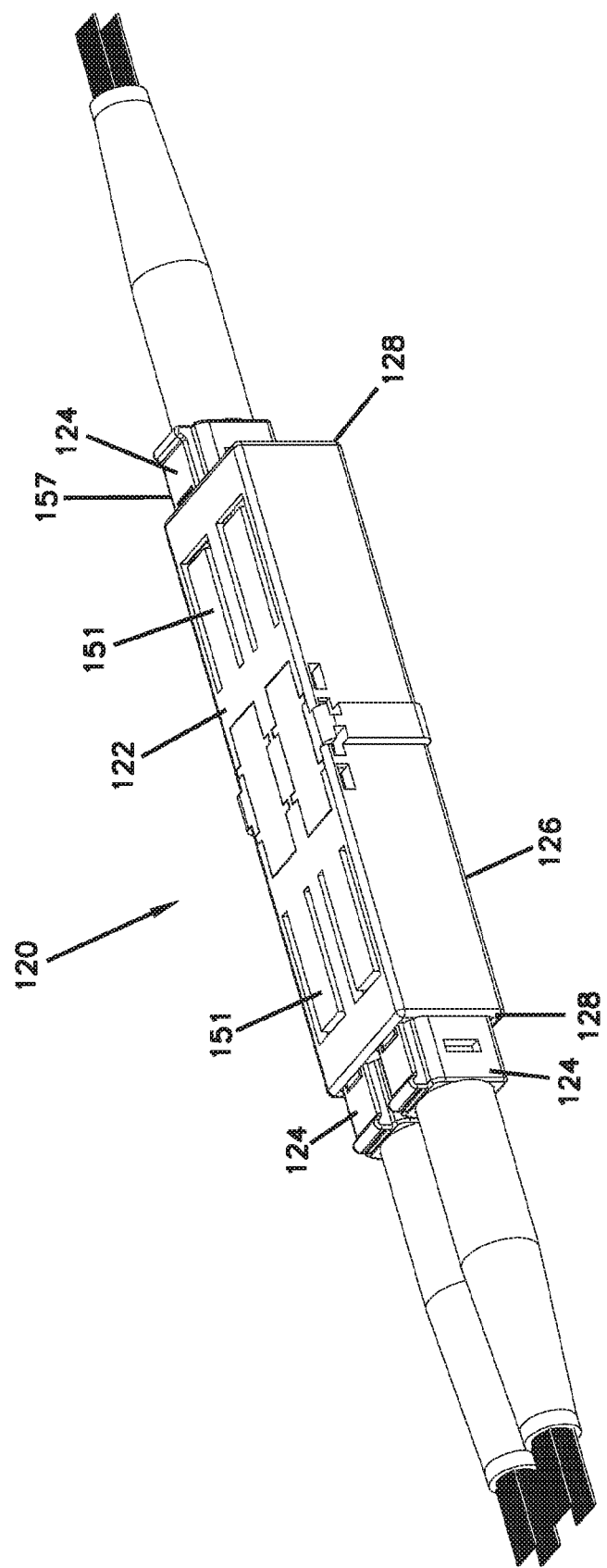
FIG. 15 is a perspective view depicting another fiber optic connection system in accordance with the principles of the present disclosure.
Figure 16:
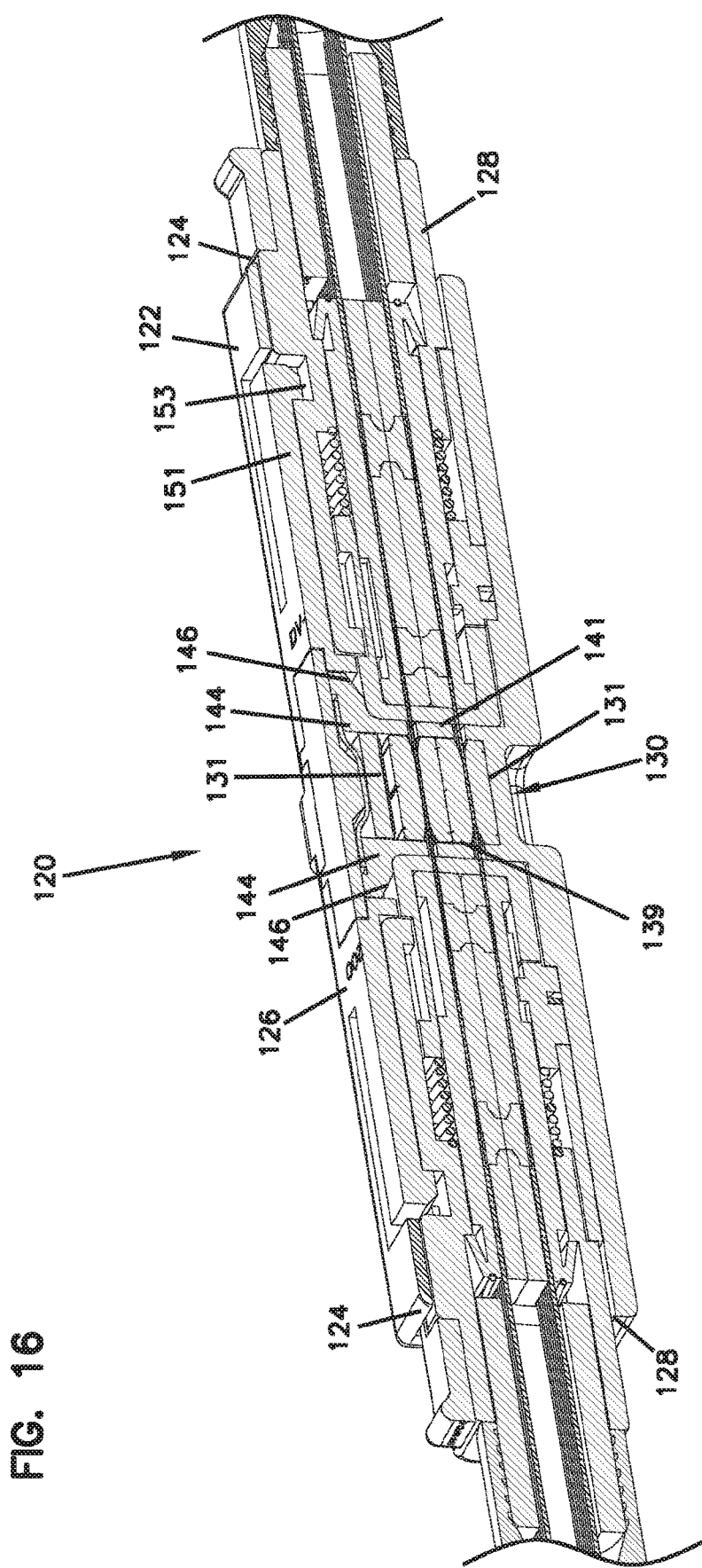
FIG. 16 is a cross-sectional view cut longitudinally through a first set of co-axial connector ports of the fiber optic alignment system of FIG. 15.
Figure 17:
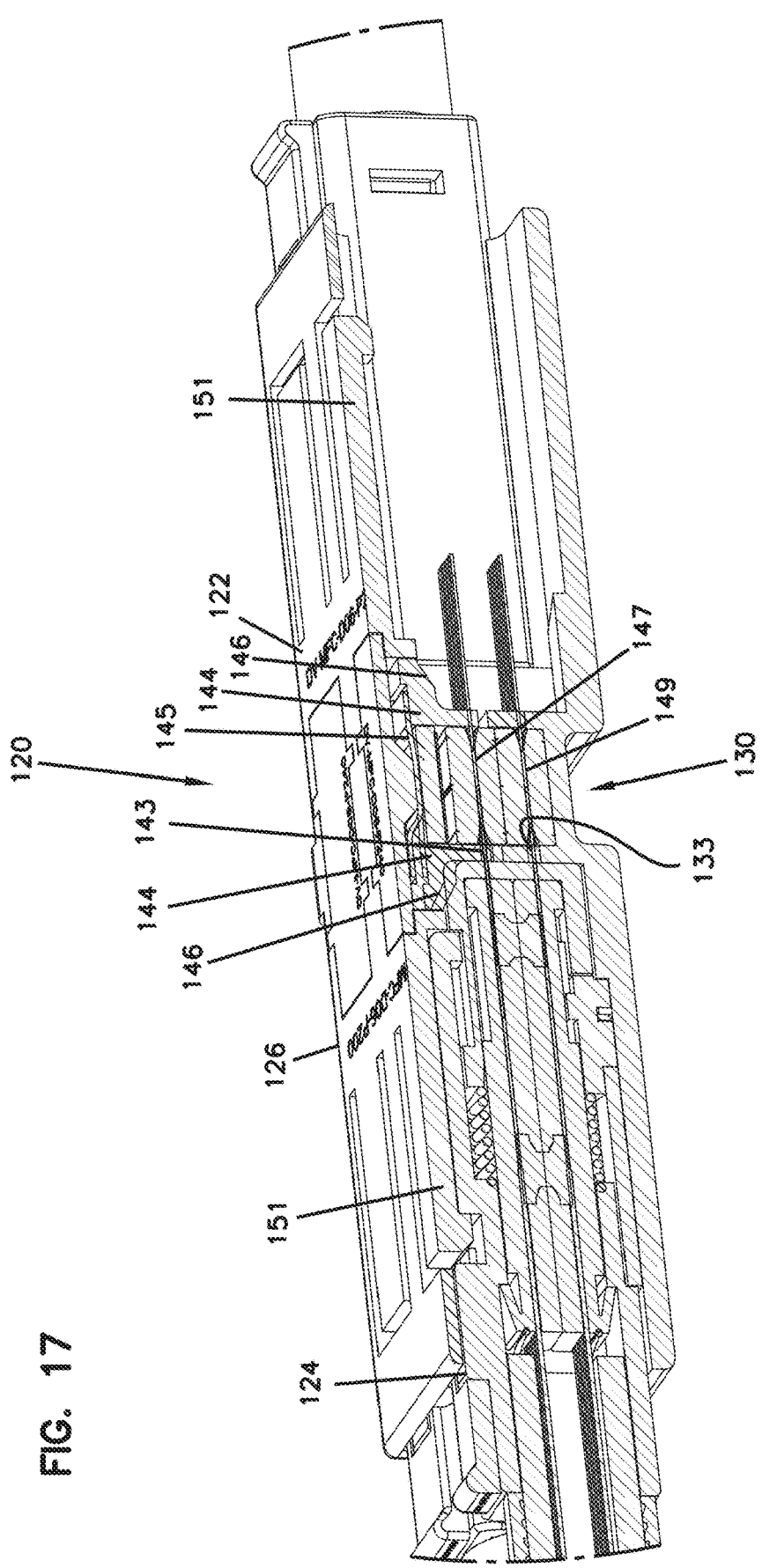
FIG. 17 is a longitudinal cross-sectional view cut through a second set of coaxial connector ports of the fiber optic connection system of FIG. 15.
Figure 18:
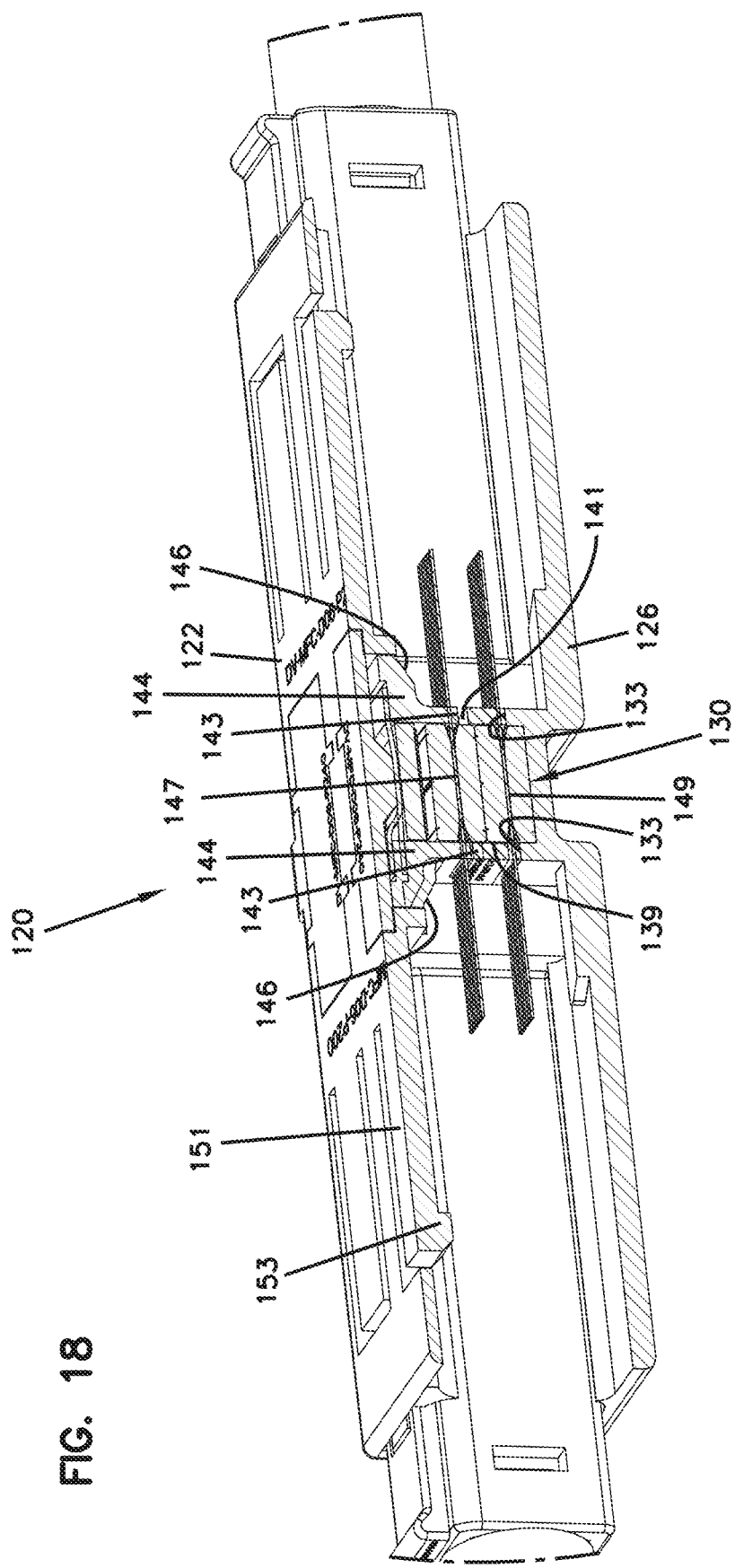
FIG. 18 is a cross-sectional view cut longitudinally through the second set of co-axially aligned connector ports of the fiber optic adapter of the fiber optic connection system of FIG. 15 with both of the connector ports being shown vacant.
Figure 19:
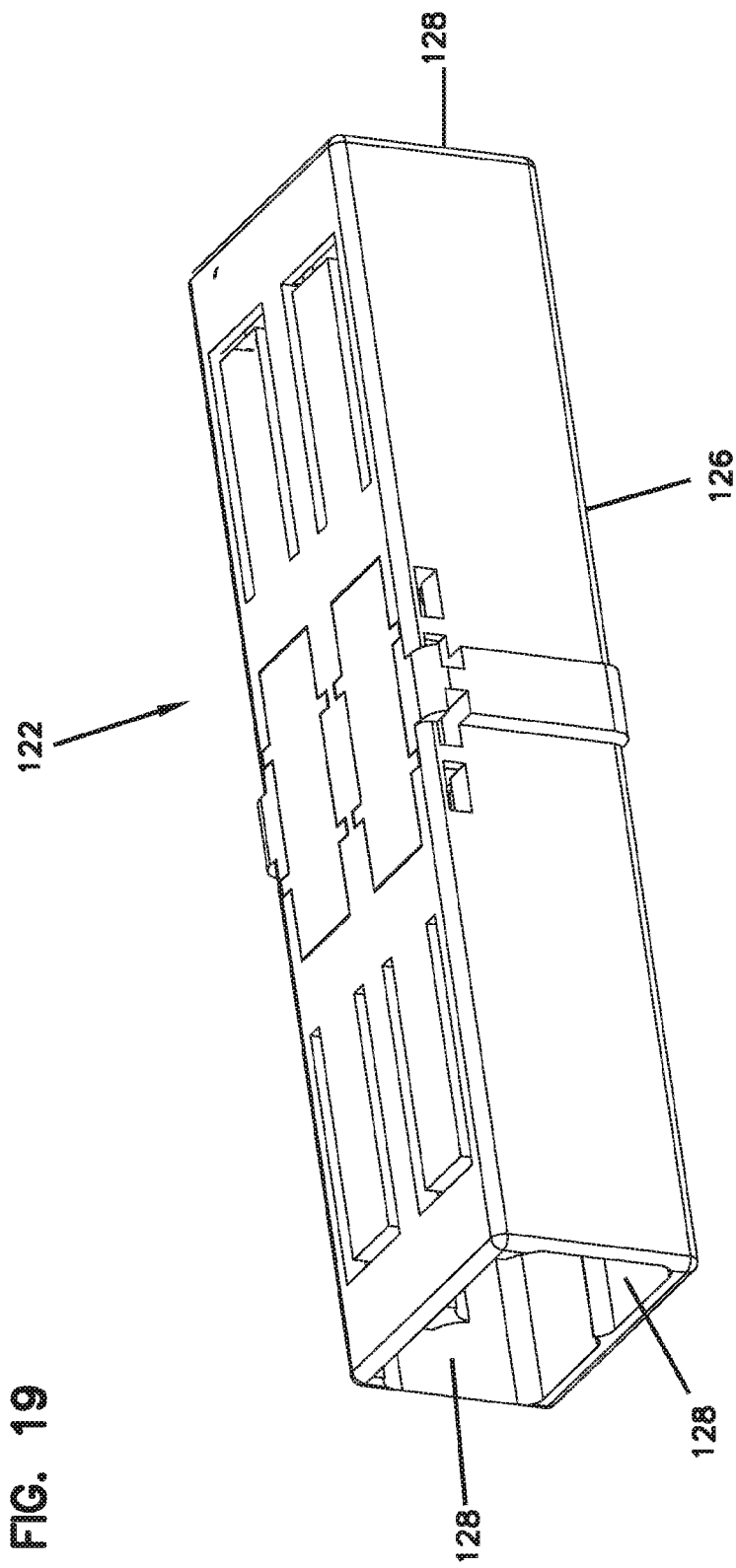
FIG. 19 is a perspective view of the fiber optic adapter of the fiber optic connection system of FIG. 15.

FIGS. 15-17 illustrate another fiber optic connection system 120 in accordance with the principles of the present disclosure. The fiber optic connection system 120 includes a fiber optic adapter 122 having an adapter footprint or form factor that is backward compatible with a mounting structure for receiving a standard duplex LC adapter and/or a standard simplex SC adapter. In certain examples, the adapter footprint has a transverse cross-sectional area that is the same or smaller than a standard duplex SC adapter and/or a standard simplex SC adapter. The fiber optic adapter 122 includes a fiber optic adapter body 126 defining two sets of co-axially aligned connector ports 128. The fiber optic connection system 120 further includes fiber optic connectors 124 adapted to be received within the fiber optic connector ports 128. Preferably, the fiber optic connectors 124 are ferrule-less fiber optic connectors. Preferably, fiber optic connectors 124 are multi-fiber fiber optic connectors. The fiber optic connection system 120 is similar to the fiber optic connection system 20 previously described herein, except the fiber optic connection system 120 has been modified to increase the optical connection density of the fiber optic connection system 120. In certain examples, the optical connection density is increased by utilizing multiple rows of optical fibers for each of the fiber optic connectors 124, and by also using multiple rows of fiber aligning receivers in the fiber optic adapter 122 for aligning the optical fibers of the fiber optic connectors 124. In certain examples, the fiber optic adapter 122 can include adapter structures configured to accommodate at least twenty-four optical fibers for each of the connector ports 128. In this example, fiber alignment structure can include two parallel rows of grooves (e.g., V-grooves) for aligning the optical fibers of the fiber optic connectors. Each of the parallel rows of grooves can include twelve grooves. In other examples, the fiber optic adapter 122 can include alignment structures configured to accommodate at least thirty-two optical fibers for each of the connector ports 128. In this example, the alignment structure can include two parallel rows of grooves with each row of grooves including sixteen grooves. Preferably, the grooves are V-grooves. In certain examples, the grooves cooperate to define rigid sized bores for aligning the optical fibers.

While all of the examples disclosed herein have been depicted as including duplex fiber optic adapter bodies having footprints or form factors that are the same as or at least compatible with standard duplex adapters, in other examples, the adapters can be configured with adapter footprints comparable to conventional simplex LC adapters. Additionally, it will be appreciated that adapter bodies in accordance with the principles of the present disclosure can also have footprints comparable to or the same as standard simplex SC adapters and/or standard SC duplex adapters. In still other examples, aspects in accordance of the present disclosure can also be incorporated into fiber optic adapters having unique footprints or form factors that are not necessarily backward compatible with existing conventional adapter form factors.

Figure 20:
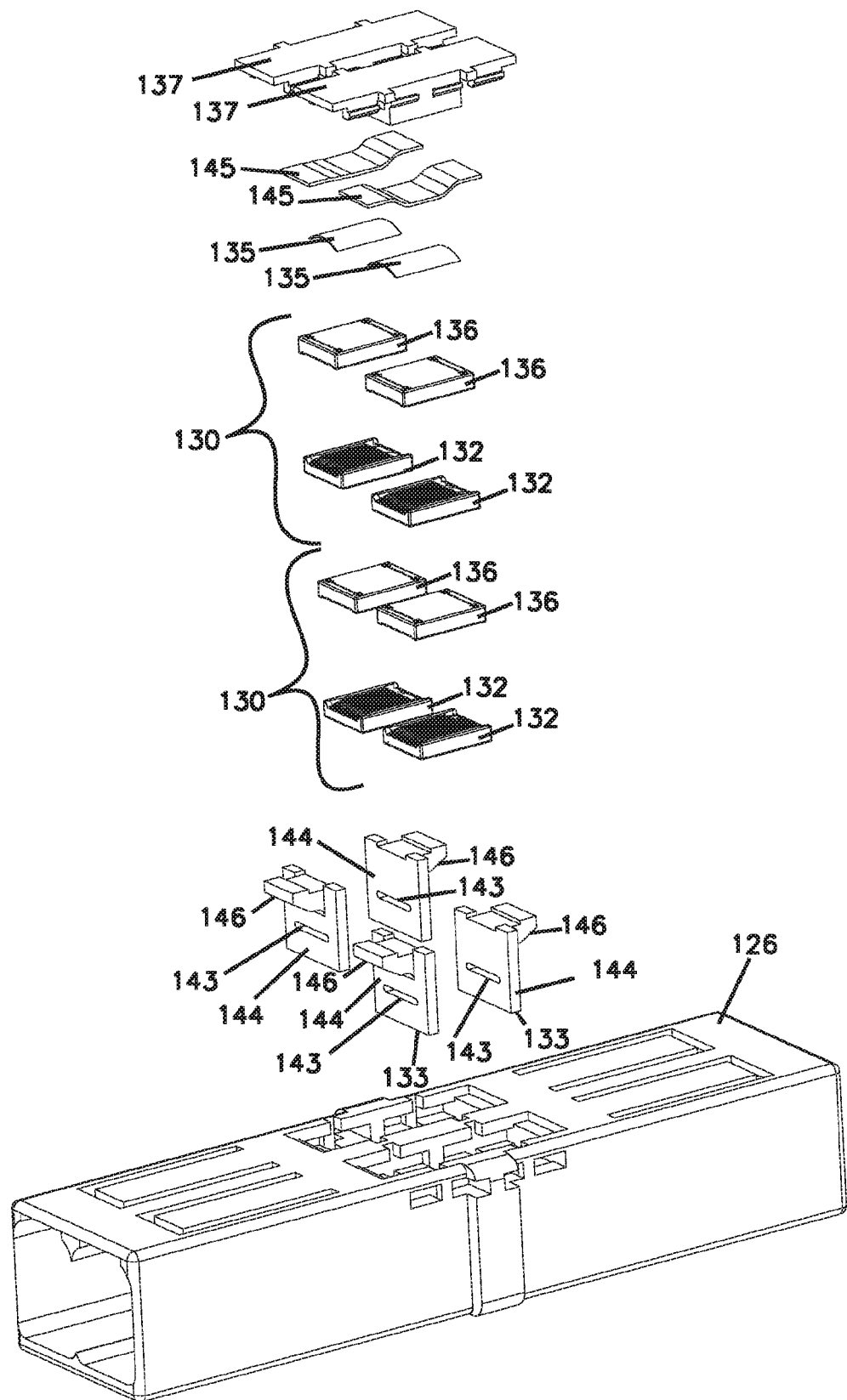
FIG. 20 is an exploded view of the fiber optic adapter of FIG. 19.
Figure 21:
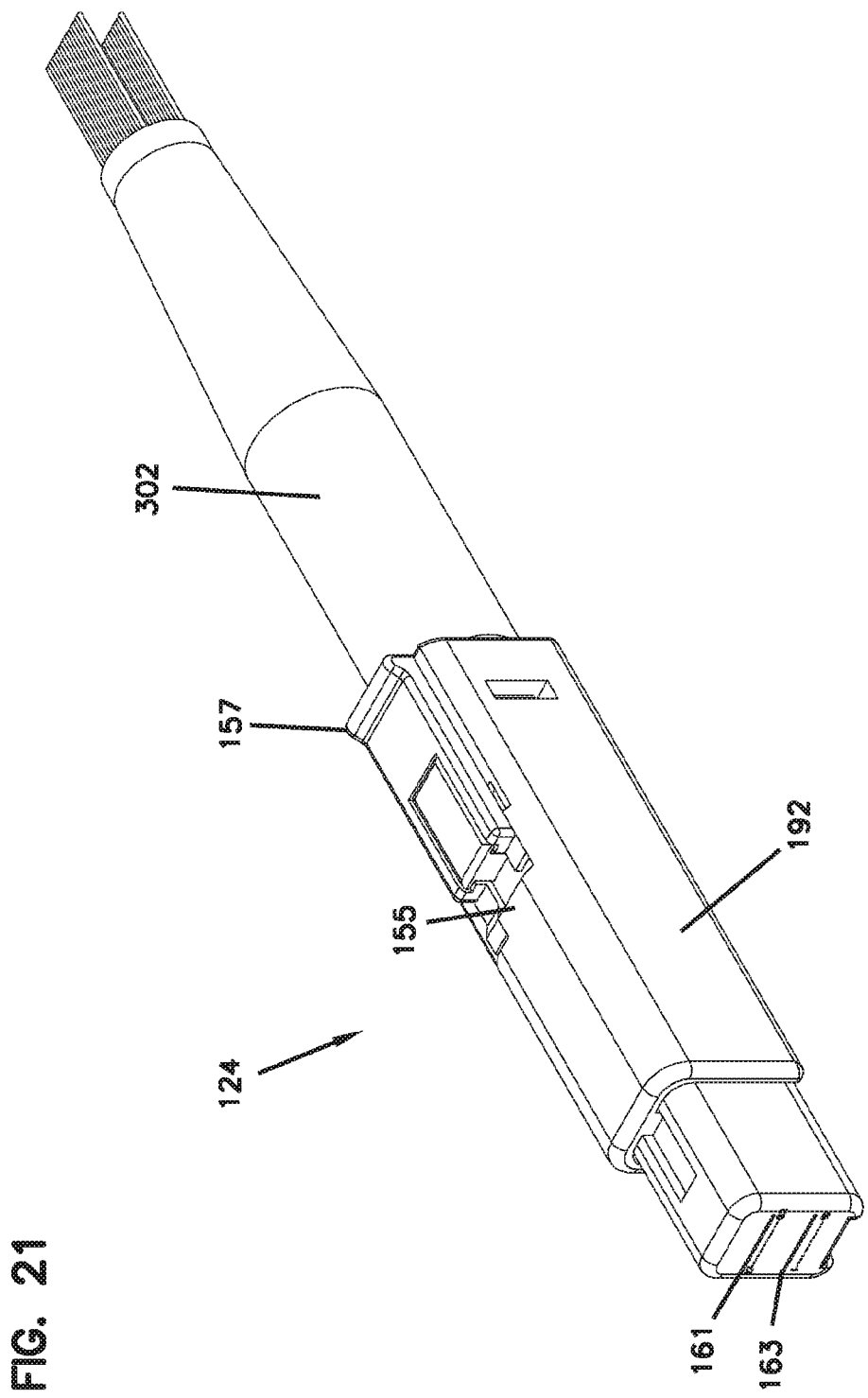
FIG. 21 is a perspective view showing a front end of one of the fiber optic connectors of the fiber optic connection system of FIG. 15.
Figure 22:
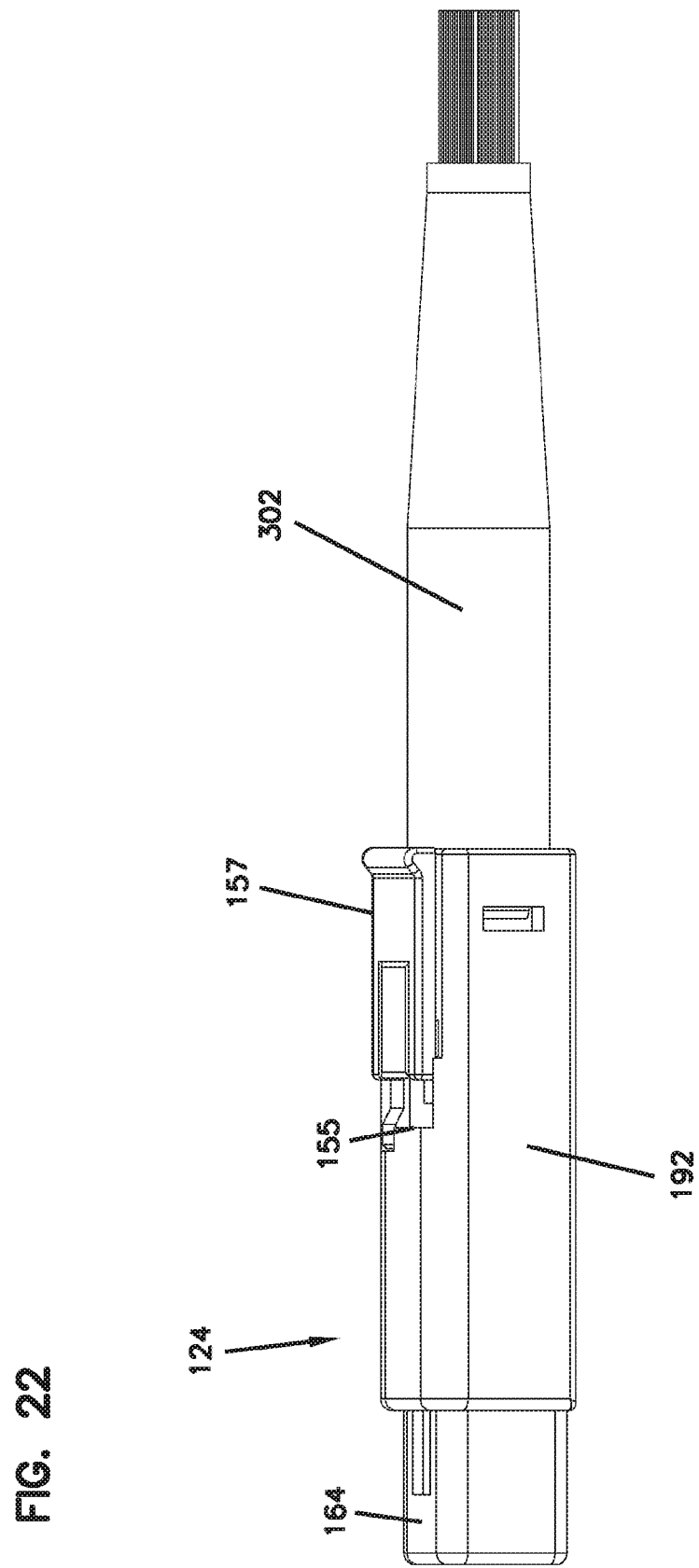
FIG. 22 is a top, side, rear perspective view of the fiber optic connector of FIG. 21.
Figure 23:
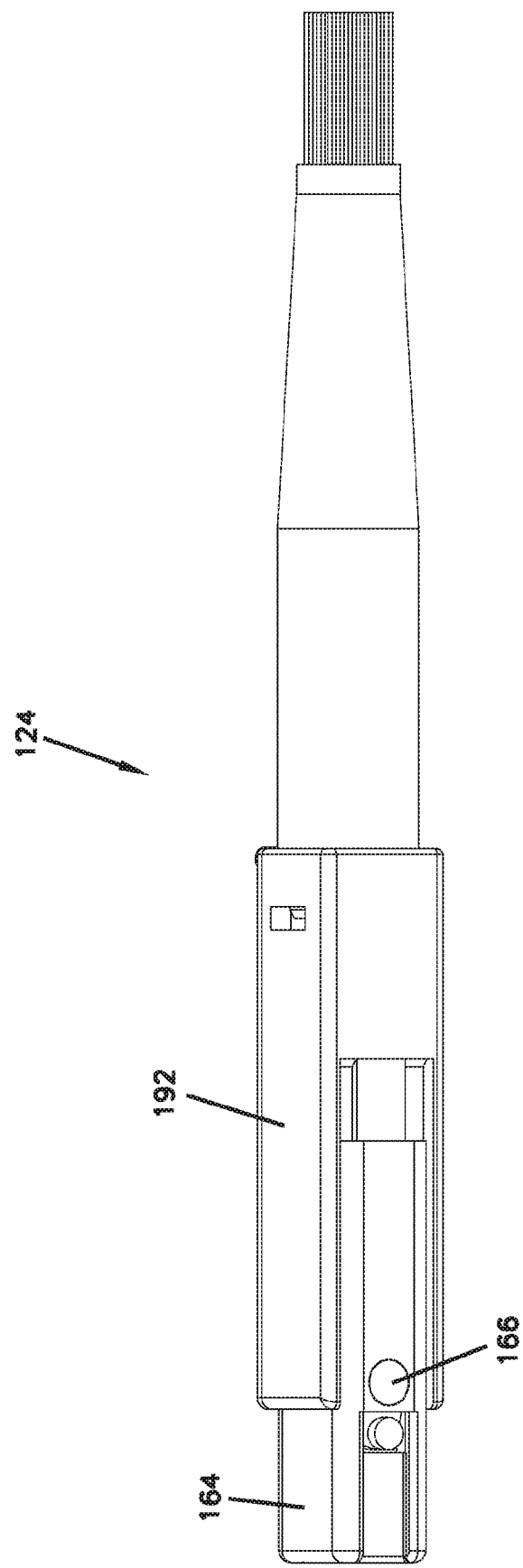
FIG. 23 is a bottom perspective view of the fiber optic connector of FIG. 21.
Figure 24:
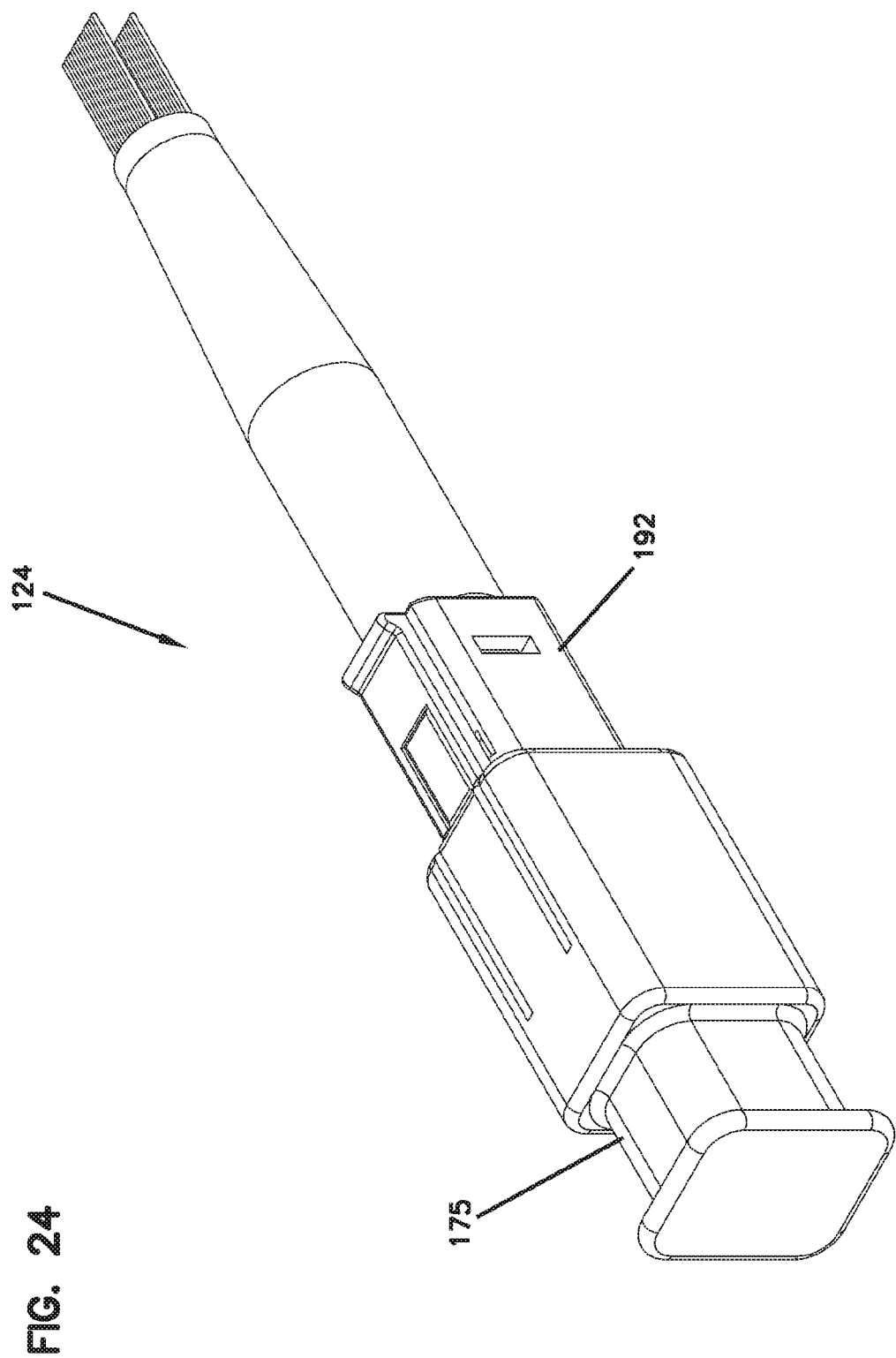
FIG. 24 shows the fiber optic connector of FIG. 21 with a dust cap mounted over the front end of the fiber optic connector.

Referring to FIGS. 16, 17 and 20, the fiber optic adapter 122 includes fiber alignment structures 130 positioned between the co-axially aligned fiber optic connector ports 128. Each of the fiber alignment structures 130 can include multiple rows of fiber receiving structures such as multiple rows of fiber alignment grooves. As shown at FIG. 16, each of the fiber alignment structures 130 includes upper and lower horizontal rows of alignment grooves 131. In a preferred example, either twelve or sixteen alignment grooves 131 are provided for each row of alignment grooves 131. In certain examples, the alignment grooves 130 can contain index matching gel. In the depicted example, each of the fiber alignment structures 130 includes two groove defining pieces 132 each having a corresponding cover piece 136. In a preferred example, the various pieces forming each fiber alignment structure 130 are stacked together and a spring 135 can be used to bias the stack of pieces or components firmly together. In certain examples, spring 135 can include a wave spring formed by a curved piece of spring-like material such as metal. The spring 130 can be compressed between the stack of components forming the fiber alignment structure 130 and a top cover 137 of the fiber optic adapter 122.

It will be appreciated that the fiber alignment structures 130 can include opposite ends 139, 141 that face in opposite directions and that are adapted for receiving the optical fibers of the fiber optic connectors 124 inserted in the coaxially aligned ports 128. The fiber optic adapter 122 also includes shutters 140 corresponding to each of the fiber optic connector ports 128. The shutters 140 are positioned inside the fiber optic connector ports 128 and function to block the ends 139, 141 of the fiber alignment structures 130 when fiber optic connectors 124 are not inserted within the fiber optic connector ports 128. Similar to the previously described shutters 40, the shutters 140 are linearly movable relative to the adapter body 126 between open and closed positions. The shutters 140 can include ramps 146 that are engaged by the fiber optic connectors 124 when the fiber optic connectors 124 are inserted into the connector ports 128 to cause the shutters 140 to move from the closed positions to the open positions. A spring structure such as a leaf spring arrangement 145 can be used to individually bias the shutters 140 toward the closed positions. The shutters 140 are separately and independently movable between the open and closed positions. In certain examples, shutters 140 can include fiber receiving structures 143 defined axially through the shutters. Examples of fiber receiving structures can include a slot, a plurality of openings or other type of open structure through which optical fibers can extend. The shutters 140 can also include bottom ends 133. It will be appreciated that the fiber alignment structures 130 can each include upper and lower rows of alignment grooves 147, 149. When the shutters 140 move to the open positions, the fiber receiving structures 143 align with the upper rows of alignment grooves 147 so that an upper row of optical fibers provided by the fiber optic connectors 124 can pass through the fiber receiving structures 143 and into the upper row of alignment grooves 147. Additionally, when the shutters 140 are in the open positions, the bottom ends 133 of the shutters 140 are positioned above the lower rows of alignment grooves 149 such that lower rows of optical fibers carried by the fiber optic connectors 124 can pass under the shutters 140 and into the lower row of fiber alignment grooves 149. When the shutters 140 are in the closed positions, the fiber receiving structures 143 are positioned between the upper and lower rows of fiber alignment grooves 147, 149 and the bottom ends 145 of the shutters 140 are positioned below the lower rows of fiber alignment grooves 149. Thus, when the shutters 140 are in the closed positions, the shutters 140 include material that effectively blocks access to the upper and lower rows of fiber alignment grooves 147, 149.

In certain examples, the fiber optic adapter 122 further includes structure for retaining the fiber optic connectors 124 in the connector ports 128. In the depicted example, the adapter body 126 includes integral latches 151 for securing the fiber optic connectors 124 in the fiber optic connector ports 128. In certain examples, the latches 151 can have a cantilevered configuration and can have a resilient construction. In certain examples, the latches 151 can include catches 153 that engage shoulders 155 provided on the fiber optic connectors 124 when the fiber optic connectors 124 are inserted within the fiber optic connector ports 128. The fiber optic connectors 124 can include slidable release elements 157 that are slidable relative to main connector bodies of the fiber optic connectors 124. To release one of the fiber optic connectors 124 from its corresponding fiber optic connector port 128, the slidable release element 157 is pulled axially outwardly relative to the main connector body of the fiber optic connector 24 causing the corresponding latch 151 of the fiber optic adapter 122 to flex outwardly such that the catch 153 disengages from the shoulder 155 thereby allowing the fiber optic connector 124 to be pulled from its corresponding connector port 128.

It will be appreciated that the fiber optic adapter 122 has a top-load assembly configuration in which the various components are loaded into the adapter body 126 from a top side of the adapter body. Referring to FIG. 20, the fiber optic adapter 120 is assembled by initially loading the shutters 140 into corresponding shutter receptacles defined by the adapter body 126. Next, the fiber alignment structures 130 are assembled in stacks and loaded into corresponding receptacles defined within the adapter body 126 between the shutter receptacles. In certain examples, index matching gel can be also loaded into the alignment grooves of the fiber alignment structures 130. Once the fiber alignment structures 130 have been loaded into the adapter body 126, the spring 135 is loaded on top of the fiber alignment structures 130 and the leaf spring arrangement 144 is loaded in the top cover 137. Finally, the top cover 137 is snapped into the top side of the adapter body 126 to retain the various components in the interior of the adapter body 126 and to place the leaf spring arrangement on top of the shutters 140. The action of snapping the top cover into the top side of the adapter body 126 causes compression of the spring 135 and that application of spring load to the shutters 140 by the leaf spring arrangement 144.

Figure 25:
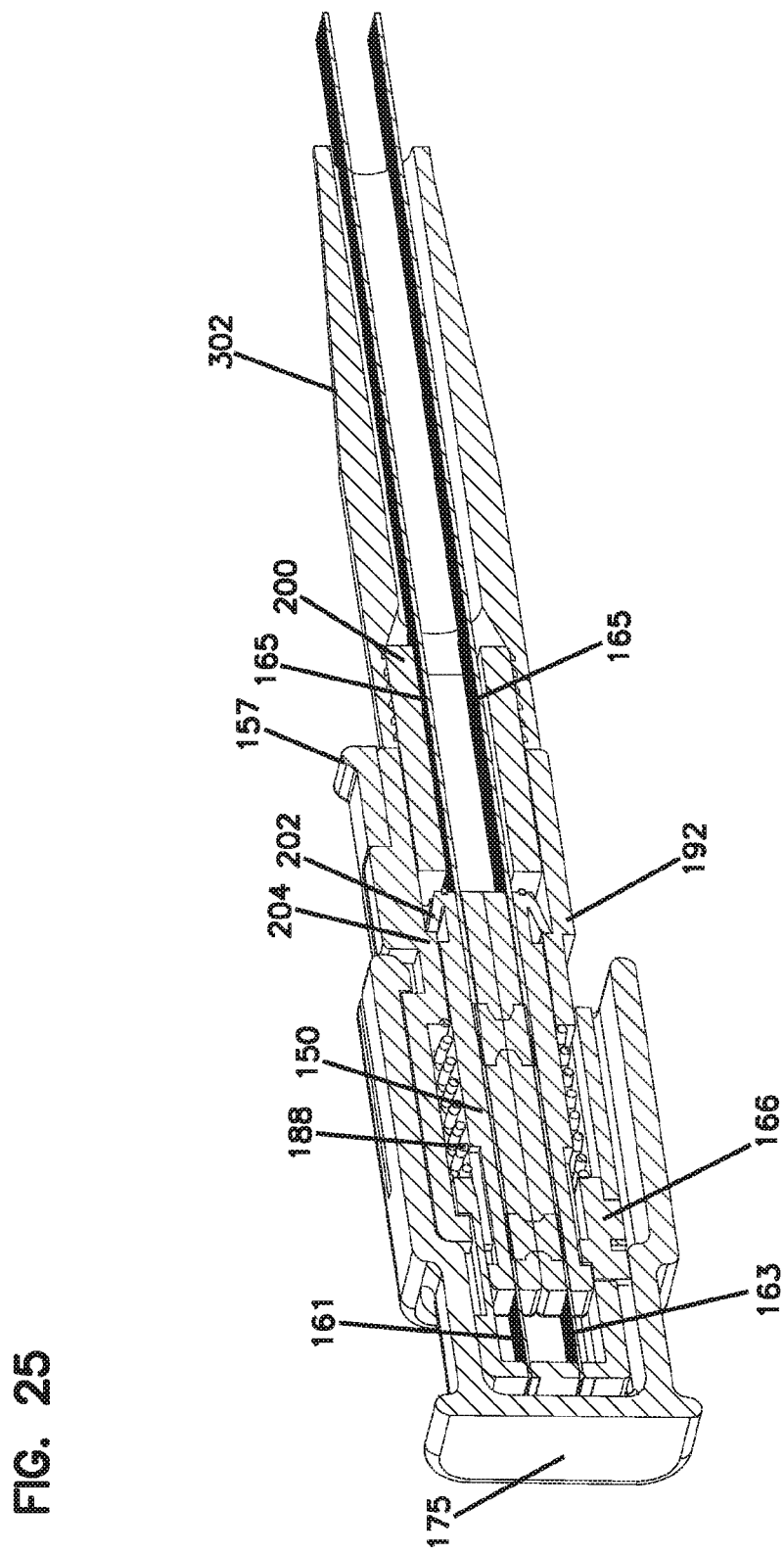
FIG. 25 is a longitudinal cross-sectional view of the fiber optic connector of FIG. 24.

FIGS. 21-27 show various views of one of the fiber optic connector 124. It will be appreciated that the fiber optic connector 124 and the previously described fiber optic connector 24 have similar configurations, except the fiber optic connector 124 has been modified to increase the fiber optic connection density. For example, the fiber optic connector 124 is a ferrule-less, multi-fiber fiber optic connector having multiple rows of optical fibers having non-ferrulized ends. As depicted at FIG. 25, the fiber optic connector 124 includes first and second rows of optical fibers 161, 163. In the depicted example, the first row of optical fibers 161 is an upper row and the second row of optical fibers 163 is a lower row. In one example, each of the rows of optical fibers 161, 163 can include twelve optical fibers. In the depicted example, each of the rows of optical fibers 161, 163 includes sixteen optical fibers such that the fiber optic connector 124 has a total of thirty-two optical fibers. It will also be appreciated that as compared to the fiber optic connector 24, the fiber optic connector 124 had a modified retention structure for retaining the fiber optic connector 124 in one of the fiber optic connector ports 128. For example, rather than having a flexible integrated latch, the fiber optic connector 124 has a retention shoulder 155 (see FIG. 22) that engages with at least one of the latches 151 of the fiber optic adapter 122 when the fiber optic connector 124 is inserted within one of the fiber optic connector ports 128. The fiber optic connector 124 also includes the sliding release element 157 that is slid rearwardly relative to the main outer body of the fiber optic connector 124 to release the latch 151 from the shoulder 155.

Similar to the fiber optic connector 24, the fiber optic connector 124 includes an inner body 150 supporting a plurality of optical fibers 165 with non-ferrulized end portions of the optical fibers projecting forwardly from the inner connector body 150. The optical fibers 165 form the first and second rows of optical fibers 161, 163. In the depicted example, the inner connector body 150 is formed by two fiber holders 150a, 150b that mount together to form the connector body 150. Each of the fiber holders 150a, 150b includes a first holder piece 171 and a second holder piece 173 that are secured together with the corresponding optical fibers 165 secured therein between. Preferably, a bonding material (e.g., an adhesive such as epoxy or a glue) is used to secure the optical fibers between the holder pieces 171, 173 and can also facilitate holding the first and second holder pieces 171, 173 together. In certain examples, defined bonding locations such as cavities are provided for receiving the bonding material. In certain examples, the bonding material can be injected between the first and second holder pieces 171, 173 after the holder pieces have been assembled with the optical fibers 165 therein between.

Similar to the fiber optic connector 24, the fiber optic connector 124 includes a retractable fiber shroud 164 that mounts over the front end of the inner connector body 150 and is axially (e.g., telescopically) movable relative to the inner connector body 150 between a first position where the non-ferrulized end portions of the optical fibers 165 are protected within the fiber shroud 164 and a second position where the non-ferrulized portions of the optical fibers 165 protrude outwardly beyond a front face of the fiber shroud 164. In certain examples, a removable dust cap 175 can be mounted over the front end of the fiber optic connector 124 so as to cover the front end face of the fiber shroud 164. In the depicted example, the dust cap 175 includes a snap-fit connection interface that snaps onto the outer connector body 192 of the fiber optic connector 124. Similar to the fiber optic connector 24, a pivotal safety lock 166 is provided for locking the fiber shroud 164 in the first position. When the fiber optic connector 24 is inserted within one of the fiber optic connector ports 128, the pivotal lock 166 moves to a release position such that the fiber shroud 164 can move to the second position where the optical fibers 165 are exposed at the front end of the fiber optic connector 124.

Figure 26:
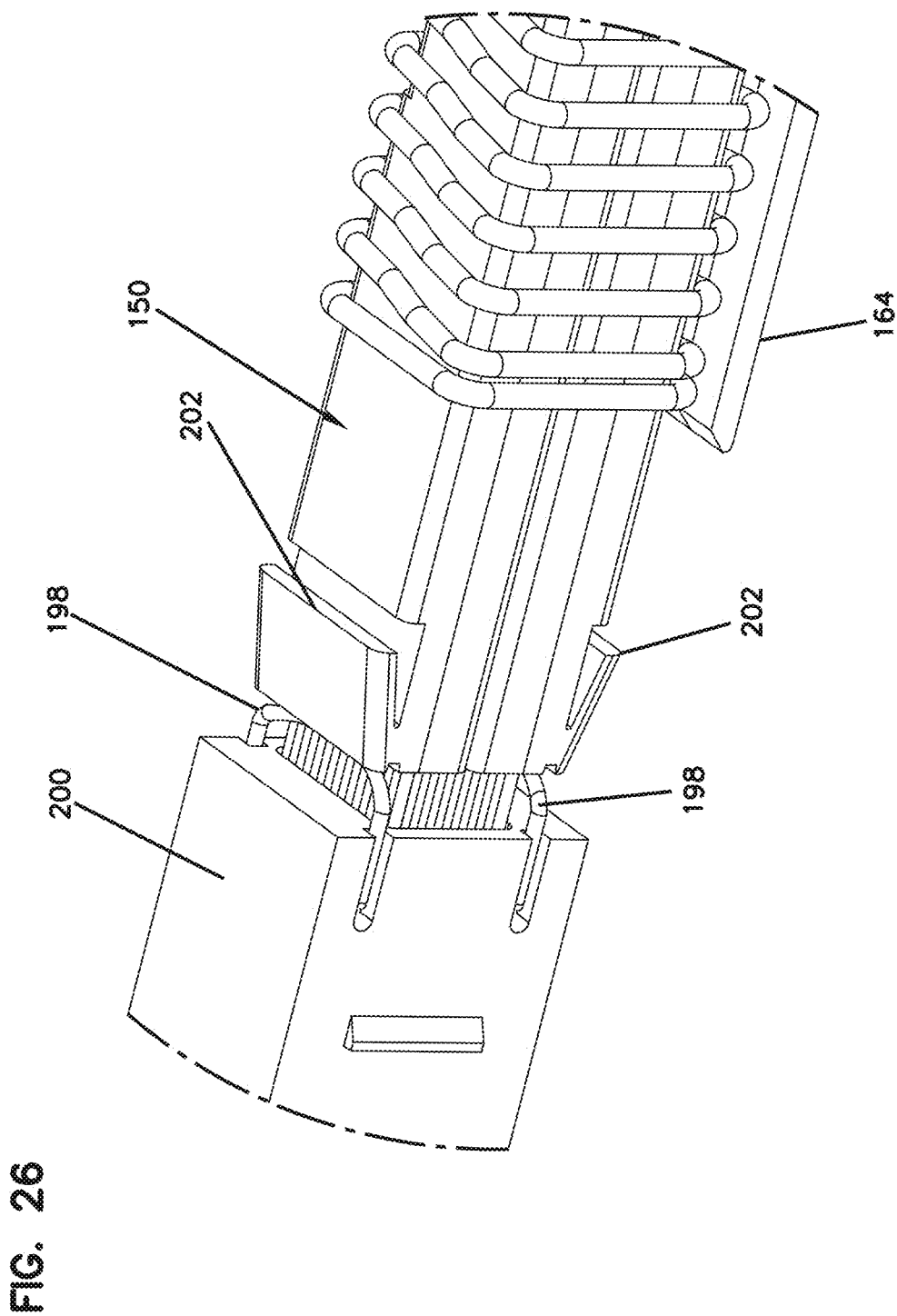
FIG. 26 shows an example spring-biasing arrangement for forwardly biasing a fiber holder of the fiber optic connector of FIG. 21.
Figure 27:
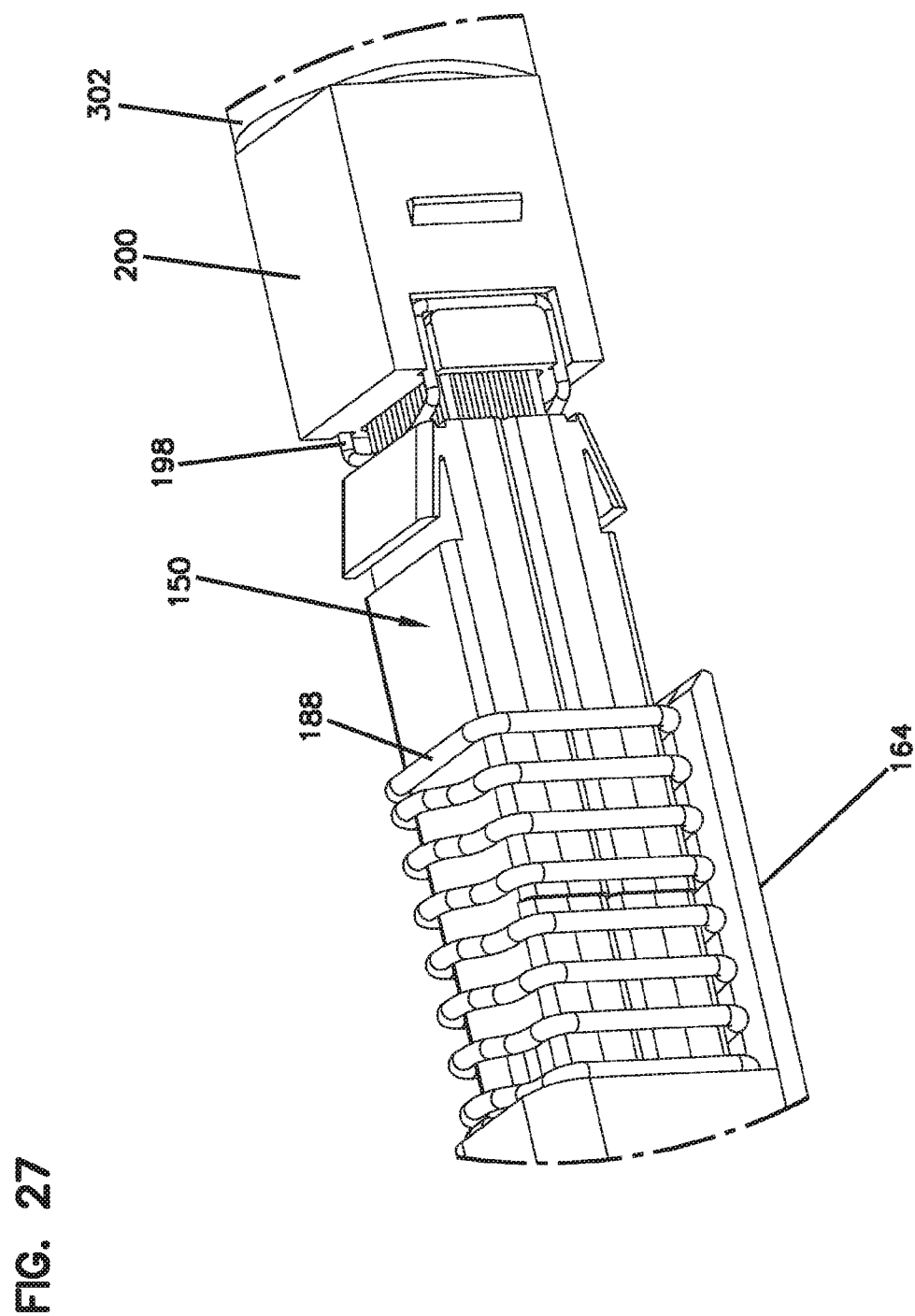
FIG. 27 is another view of the forward biasing arrangement of FIG. 26.

Referring to FIG. 25, the inner connector body 150 includes a stop structure 202 that engages a stop structure 204 within the interior of the outer connector body 192 to limit forward movement of the inner connector body 150 relative to the outer connector body 192. It will be appreciated that the inner connector body 150 can move axially relative to the outer connector body 192. A spring structure 198 is provided for biasing the inner connector body 150 in a forward direction relative to the outer connector body 192. When the fiber optic connector 124 is connected to another fiber optic connector 124 via the fiber optic adapter 122, the opposing ends of the optical fibers of the fiber optic connectors 124 desired to be coupled together abut one another and apply rear loading to the inner connector body 150 causing the inner connector body to move rearwardly relative to the outer connector body 192 against the bias of the spring structure 198. In this way, the spring structure 198 assists in maintaining abutting contact between the end faces of the coaxially aligned optical fibers of the interconnected fiber optic connectors 124. As shown at FIG. 26, the spring structure 198 attaches to a rear connector body 200 that mounts at a rear end of the outer connector body 192. The spring structure includes upper and lower spring sections that abut against rear ends of the fiber holders 150a, 150b.

Referring to FIG. 25, a shroud spring 188 mounts over the inner connector body 150 and functions to bias the fiber shroud 164 to its first, forward position and also functions to bias the pivotal lock 166 toward its locked position. A boot 302 mounts at the rear end of the fiber optic connector at the rear connector body 200.

It will be appreciated that connectors in accordance with the principles of the present disclosure are typically mounted at the end of fiber optic cables. A typical fiber optic cable may include an outer jacket containing at least one optical fiber, or a plurality of optical fibers. The fiber optic cable can also include reinforcing elements such as tensile reinforcing elements in the form of string-like reinforcing elements such as Aramid yarn. In certain examples, connectors in accordance with the principles of the present disclosure can have structure for securing the reinforcing elements to the rear end of the fiber optic connector. In certain examples, the tensile reinforcing elements and/or the cable jacket can be coupled to the rear end of the outer connector body 192 or the rear connector body 200 by means such as adhesive, crimping, fasteners or other means.

To assemble the fiber optic connector 124, the spring structures 198 are secured to the rear connector body 200 and the optical fibers (e.g., which may be in ribbon form) are laterally inserted into the interior of the rear connector body 200. The optical fibers 165 are then loaded and bonded within the fiber holders 150a, 150b, and the fiber holders 150a, 150b are coupled together. The sliding release element 157 is then installed on the exterior of the outer connector body 192 (e.g., via a snap-fit connection). The outer connector body 192 is then installed over the pre-assembled connector body 150 and the rear connector body 200 is secured (e.g., snapped in place) at the rear end of the outer connector body 192. The shroud spring 188 is then loaded into the outer connector body 192 and the pivotal lock 166 is installed on the fiber shroud 164. The fiber shroud 164 is then loaded into the front end of the outer connector body and over the front end of the inner connector body 150. The dust cap 175 is then mounted over the front end of the fiber optic connector, and the boot 302 can be installed at the rear end of the fiber optic connector. If the fiber optic cable to which the fiber optic connector 124 is terminated includes reinforcing elements such as Aramid yarn, the reinforcing elements can be secured to the rear end of the fiber optic connector prior to installing the boot.

The various examples described above are provided by way of illustration only and should not be construed to limit the scope of the present disclosure. Those skilled in the art will readily recognize various modifications and changes that may be made with respect to the examples and applications illustrated and described herein without departing from the true spirit and scope of the present disclosure. Aspects of the present disclosure are applicable to single fiber connectors, dual fiber connectors, and to fiber optic connectors having 4, 8, 12, 16, 24, 32 or more optical fibers.

For higher count fiber optical connectors, more than two rows of optical fibers may be provided.

What is claimed is:

1. A fiber optic connector comprising:
   an inner connector body having a length that extends along a connector axis between a front end and a rear end of the inner connector body;
   at least one optical fiber that extends through the length of the inner connector body, the at least one optical fiber having a non-ferrulized end portion that extends forwardly from the front end of the inner connector body, the at least one optical fiber being secured within the inner connector body;
   an outer connector body mounted over the inner connector body, the outer connector body including structure for securing the fiber optic connector within a port of a fiber optic adapter; and
   the inner connector body being movable along the connector axis relative to the outer connector body, wherein the inner connector body includes a first piece and a second piece.

2. The fiber optic connector of claim 1, further comprising a spring for biasing the inner connector body in a forward direction relative to the outer connector body.

3. The fiber optic connector of claim 1, wherein the inner connector body includes a first stop that engages a second stop of the outer connector body to limit forward movement of the inner connector body relative to the outer connector body.

4. The fiber optic connector of claim 3, wherein the first stop is defined by resilient arms.

5. The fiber optic connector of claim 1, wherein the at least one optical fiber includes a plurality of optical fibers having end portions that extend axially outwardly from the front end of the inner connector body.

6. The fiber optic connector of claim 5, wherein the optical fibers are arranged in at least one row.

7. The fiber optic connector of claim 1, wherein the at least one optical fiber is bonded within the inner connector body.

8. The fiber optic connector of claim 7, wherein the inner connector body lacks structure for allowing the optical fiber to buckle within the inner connector body.

9. The fiber optic connector of claim 2, further comprising a rear piece that attaches to a rear end of the outer connector body, wherein the spring mounts to the rear piece.

10. The fiber optic connector of claim 1, further comprising a fiber shroud that telescopically mounts at the front end of the inner connector body, the fiber shroud being telescopically movable along the connector axis relative to the inner connector body between an extended position in which the end portion of the at least one optical fiber is recessed and protected within the fiber shroud and a retracted position in which the end portion of the at least one optical fiber protrudes axially outwardly beyond the fiber shroud.

11. The fiber optic connector of claim 10, further comprising a pivotal lock that pivots about a pivot axis between a locking position in which the fiber shroud is locked in the extended position relative to the inner connector body and a release position in which the fiber shroud can be moved from the extended position to the retracted position relative to the inner connector body.

12. The fiber optic connector of claim 11, further comprising a spring mounted over the inner connector body for biasing the fiber shroud toward the extended position and also for biasing the pivotal lock toward the locked position.

13. The fiber optic connector of claim 5, wherein the plurality of optical fibers have a center-to-center spacing less than 260 microns.

14. The fiber optic connector of claim 5, wherein the plurality of optical fibers have a center-to-center spacing of about 250 microns.

15. The fiber optic connector of claim 5, wherein the plurality of optical fibers have a center-to-center spacing less than 210 microns.

16. The fiber optic connector of claim 5, wherein the plurality of optical fibers have a center-to-center spacing of about 200 microns.

17. The fiber optic connector of claim 10, further comprising a removable dust cap that mounts over the fiber shroud.

18. The fiber optic connector of claim 1, wherein the at least one optical fiber is bonded between the first and second pieces.

19. A fiber optic connector comprising:
    an inner connector body having a length that extends along a connector axis between a front end and a rear end of the inner connector body;
    at least one optical fiber that extends through the length of the inner connector body, the at least one optical fiber having a non-ferrulized end portion that extends forwardly from the front end of the inner connector body, the at least one optical fiber being secured within the inner connector body; and
    an outer connector body mounted over the inner connector body, the outer connector body including structure for securing the fiber optic connector within a port of a fiber optic adapter, the inner connector body being movable along the connector axis relative to the outer connector body;
    wherein the inner connector body includes a first stop that engages a second stop of the outer connector body to limit forward movement of the inner connector body relative to the outer connector body and wherein the first stop is defined by resilient arms.

20. A fiber optic connector comprising:
    an inner connector body having a length that extends along a connector axis between a front end and a rear end of the inner connector body;
    at least one optical fiber that extends through the length of the inner connector body, the at least one optical fiber having a non-ferrulized end portion that extends forwardly from the front end of the inner connector body, the at least one optical fiber being secured within the inner connector body;
    an outer connector body mounted over the inner connector body, the outer connector body including structure for securing the fiber optic connector within a port of a fiber optic adapter, the inner connector body being movable along the connector axis relative to the outer connector body;
    a fiber shroud that telescopically mounts at the front end of the inner connector body, the fiber shroud being telescopically movable along the connector axis relative to the inner connector body between an extended position in which the end portion of the at least one optical fiber is recessed and protected within the fiber shroud and a retracted position in which the end portion of the at least one optical fiber protrudes axially outwardly beyond the fiber shroud; and
    a pivotal lock that pivots about a pivot axis between a locking position in which the fiber shroud is locked in the extended position relative to the inner connector body and a release position in which the fiber shroud can be moved from the extended position to the retracted position relative to the inner connector body.

21. A fiber optic connector comprising:

an inner connector body having a length that extends along a connector axis between a front end and a rear end of the inner connector body;

at least one optical fiber that extends through the length of the inner connector body, the at least one optical fiber having a non-ferrulized end portion that extends forwardly from the front end of the inner connector body, the at least one optical fiber being secured within the inner connector body; and an outer connector body mounted over the inner connector body, the outer connector body including structure for securing the fiber optic connector within a port of a fiber optic adapter, the inner connector body being movable along the connector axis relative to the outer connector body;

wherein the at least one optical fiber includes a plurality of optical fibers, and wherein the plurality of optical fibers have a center-to-center spacing less than 260 microns.

22. The fiber optic connector of claim 21, further comprising a spring for biasing the inner connector body in a forward direction relative to the outer connector body.

* * * * *